US008467466B2

(12) United States Patent
Bjerke et al.

(10) Patent No.: US 8,467,466 B2
(45) Date of Patent: Jun. 18, 2013

(54) REDUCED COMPLEXITY DETECTION AND DECODING FOR A RECEIVER IN A COMMUNICATION SYSTEM

(75) Inventors: Bjorn Bjerke, Boston, MA (US); Irina Medvedev, Somerville, MA (US); John W. Ketchum, Harvard, MA (US); Mark S. Wallace, Bedford, MA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1530 days.

(21) Appl. No.: 11/345,976

(22) Filed: Feb. 1, 2006

(65) Prior Publication Data

US 2007/0116143 A1     May 24, 2007

Related U.S. Application Data

(60) Provisional application No. 60/738,159, filed on Nov. 18, 2005.

(51) Int. Cl.
*H04L 23/02* (2006.01)
*H04L 5/12* (2006.01)

(52) U.S. Cl.
USPC ............ 375/262; 375/341; 375/343; 375/265

(58) Field of Classification Search
USPC ................................. 375/260, 262, 267, 340
See application file for complete search history.

(56) References Cited

U.S. PATENT DOCUMENTS

| 5,566,209 | A | * | 10/1996 | Forssen et al. | ................ 375/262 |
| 6,757,337 | B2 | * | 6/2004 | Zhuang et al. | ................ 375/267 |
| 7,154,936 | B2 | * | 12/2006 | Bjerke et al. | ................. 375/148 |
| 7,218,683 | B2 | * | 5/2007 | Ko et al. | ....................... 375/299 |

(Continued)

FOREIGN PATENT DOCUMENTS

| EP | 1521414 A | 4/2005 |
| EP | 1545082 A | 6/2005 |

(Continued)

OTHER PUBLICATIONS

Bahl et al., "Optimal Decoding of Linear Codes for Minimizing Symbol Error Rate," IEEE Transactions of Information Theory, pp. 284-287, Mar. 1974.

(Continued)

*Primary Examiner* — Daniel Washburn
*Assistant Examiner* — Qutbuddin Ghulamali
(74) *Attorney, Agent, or Firm* — QUALCOMM Patent Group; James Hunt Yancey, Jr.

(57) ABSTRACT

Techniques for performing detection and decoding at a receiver are described. In one scheme, the receiver obtains R received symbol streams for M data streams transmitted by a transmitter, performs receiver spatial processing on the received symbols to obtain detected symbols, performs log-likelihood ratio (LLR) computation independently for each of D best data streams, and performs LLR computation jointly for the M−D remaining data streams, where M>D≧1 and M>1. The D best data streams may be selected based on SNR and/or other criteria. In another scheme, the receiver performs LLR computation independently for each of the D best data streams, performs LLR computation jointly for the M−D remaining data streams, and reduces the number of hypotheses to consider for the joint LLR computation by performing a search for candidate hypotheses using list sphere detection, Markov chain Monte Carlo, or some other search technique.

45 Claims, 9 Drawing Sheets

U.S. PATENT DOCUMENTS

| | | | | |
|---|---|---|---|---|
| 7,317,770 | B2* | 1/2008 | Wang | 375/340 |
| 7,433,432 | B2* | 10/2008 | Hoo | 375/347 |
| 2003/0214917 | A1* | 11/2003 | Molisch et al. | 370/286 |
| 2004/0066866 | A1* | 4/2004 | Tong et al. | 375/347 |
| 2005/0018789 | A1* | 1/2005 | Jia et al. | 375/316 |
| 2005/0094713 | A1 | 5/2005 | Yellin | |
| 2005/0135498 | A1* | 6/2005 | Yee | 375/267 |
| 2005/0201478 | A1* | 9/2005 | Claussen et al. | 375/261 |

FOREIGN PATENT DOCUMENTS

| | | |
|---|---|---|
| JP | 2000269825 A | 9/2000 |
| RU | 2285335 | 10/2006 |
| RU | 2297713 | 4/2007 |
| WO | WO03049397 | 6/2003 |
| WO | 2004023663 A | 3/2004 |
| WO | WO2005034455 A1 | 4/2005 |
| WO | WO2005107125 | 11/2005 |

OTHER PUBLICATIONS

Garrett et al., "Silicon Complexity for Maximum Liklihood MIMO Detection Using Spherical Decoding," IEEE Journal of Solid-State Circuits, 39(9):1544-1552 (2004).

Hagenauer et al., "A Viterbi Algorithm with Soft-Decision Outputs and its Applications," IEEE, pp. 1680-1686 (1989).

Hochwald et al., "Achieving Near-Capacity on a Multiple-Antenna Channel," Bell Laboratories, Lucent Technologies, Dec. 2002.

Zhu et al., "On Performance of Sphere Decoding and Markov Chain Monte Carlo Detection Methods," IEEE Signal Processing Letters, 12(10):669-672 (2005).

Partial International Search Report—PCT/US06/045031, International Search Authority—European Patent Office, May 14, 2007.

International Search Report—PCT/US06/045031, International Search Authority—European Patent Office, Aug. 30, 2007.

Written Opinion—PCT/US06/045031, International Search Authority—European Patent Office, Aug. 30, 2007.

International Preliminary Report on Patentability—PCT/US06/045031, The International Bureau of WIPO—Geneva, Switzerland, May 20, 2008.

Arslan et al., "Multi-access Interference Cancellation Receiver for Time-hopping Ultra-wideband Communication", IEEE International Conference on Communications, XP010712346, Jun. 20, 2004, pp. 3394-3398, vol. 6, Piscataway, New Jersey, USA.

Sun et al., "Large CDMA Random Access Systems with Exploitation of Retransmission Diversity", IEEE Military Communications Conference, XP010901651, Oct. 17, 2005, pp. 1-6, Piscataway, New Jersey, USA.

Forssen et al, "Adaptive Antenna Arrays for GSM900/DCS1800", IEEE Vehicular Technology Conference, XP010123359, Jun. 8, 1994, pp. 605-609, New York, New York, USA.

Ye et al., "A Two-Stage Decorrelating Detector for DS/CDMA Systems", IEEE Vehicular Technology Conference, XP011064247, Mar. 2001, pp. 465-479, vol. 50, No. 2, Piscataway, New Jersey, USA.

Karjalainen et al., "Antenna-by-Antenna and Joint-over-Antenna MIMO Signal Detection Techniques for Turbo-Coded SC/MMSE Frequency Domain Equalization", IEEE Vehicular Technology Conference, XP010855547, May 30, 2005, pp. 934-938, Piscataway, New Jersey, USA.

Xiangyang et al., "Coding-Assisted MIMO Joint Detection and Decoding in Turbo-Coded OFDM", IEEE Vehicular Technology Conference, XP010608509, Sep. 24, 2002, pp. 23-27, vol. 1 of 4, Conf. 56, New York, New York, USA.

Kind, "Iterative Decoding of Overloaded Multi-access Systems", IEEE Communications Theory Workshop Proceedings, XP010912243, Feb. 2, 2005, pp. 255-259, Piscataway, New Jersey, USA.

Ariyavisitakul et al, "A List Layered Space-Time Approach for MIMO Detection", IEEE Conference on Communications, XP010825672, May 16, 2005, pp. 2679-2683, vol. 4, Piscataway, New Jersey, USA.

European Search Report—EP10013237—Search Authority—The Hague—Jan. 5, 2011.

European Search Report—EP10013238, Search Authority—The Hague Patent Office, Jan. 5, 2011.

European Search Report—EP10013239, Search Authority—The Hague Patent Office, Jan. 5, 2011.

Murakami Yutaka et al., "Likelihood Detection Utilizing Ordering and Decision of Partial Bits in Spatial Multiplexing MIMO systems", IEICE Technical Report, Oct. 13, 2005, vol. 105, No. 356, pp. 31-36.

* cited by examiner

REDUCED COMPLEXITY DETECTION AND DECODING FOR A RECEIVER IN A COMMUNICATION SYSTEM

The present application claims priority to provisional U.S. Application Ser. No. 60/738,159, entitled "REDUCED COMPLEXITY INTERATIVE DETECTION AND DECODING FOR MIMO-OFDM SYSTEMS," filed Nov. 18, 2005, assigned to the assignee hereof and incorporated herein by reference.

BACKGROUND

I. Field

The present disclosure relates generally to communication, and more specifically to techniques for performing detection and decoding at a receiver in a communication system.

II. Background

A multiple-input multiple-output (MIMO) communication system employs multiple (T) transmit antennas at a transmitter and multiple (R) receive antennas at a receiver for data transmission. A MIMO channel formed by the T transmit antennas and the R receive antennas may be decomposed into M spatial channels, where $M \leq \min \{T, R\}$. The M spatial channels may be used to transmit data in a manner to achieve higher overall throughput and/or greater reliability.

The transmitter may encode and transmit M data streams in parallel via the T transmit antennas. The receiver obtains R received symbol streams via the R receive antennas, performs MIMO detection to separate out the M data streams, and performs decoding on the detected symbol streams to recover the transmitted data streams. To achieve optimal performance, the receiver would need to evaluate many hypotheses for all possible sequences of data bits that might have been transmitted based on all of the information available at the receiver. Such an exhaustive search is computationally intensive and is prohibitive for many applications.

There is therefore a need in the art for techniques to perform detection and decoding with reduced complexity while achieving good performance.

SUMMARY

Techniques for performing detection and decoding with reduced complexity while achieving good performance are described herein. These techniques are embodied in various reduced complexity detection schemes described below.

In one reduced complexity detection scheme, a receiver obtains R received symbol streams for M data streams transmitted by a transmitter, performs receiver spatial processing (or spatial matched filtering) on the received symbols to obtain detected symbols, performs log-likelihood ratio (LLR) computation independently for each of D "best" data streams, and performs LLR computation jointly for the M−D remaining data streams, where in general $M > D \geq 1$ and $M > 1$. The D best data streams may be selected based on signal-to-noise-and-interference ratio (SNR) and/or other criteria. In another reduced complexity detection scheme, the receiver performs LLR computation independently for each of the D best data streams, performs LLR computation jointly for the M−D remaining data streams, and reduces the number of hypotheses to consider for the joint LLR computation by performing a search for candidate hypotheses using list sphere detection, Markov chain Monte Carlo, or some other search technique.

For both detection schemes, dimensionality is reduced from M to M−D by performing per-stream LLR computation for the D best data streams. The reduction in dimensionality may substantially reduce the number of hypotheses to consider for the joint LLR computation for the M−D remaining data streams. The number of hypotheses may be further reduced by performing a search for candidate hypotheses. These detection schemes may be used for (1) a single-pass receiver that performs detection and decoding once and (2) an iterative receiver that performs detection and decoding iteratively. These and other detection schemes are described in detail below.

Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The detection and decoding techniques described herein may be used for various communication systems in which multiple data streams are transmitted in parallel via a communication channel. For example, these techniques may be used for a MIMO system with a single frequency subband, a MIMO system with multiple subbands, a Code Division Multiple Access (CDMA) system, a Frequency Division Multiple Access (FDMA) system, a Time Division Multiple Access (TDMA) system, and so on. Multiple subbands may be obtained with orthogonal frequency division multiplexing (OFDM), single-carrier frequency division multiple access (SC-FDMA), or some other modulation technique. OFDM and SC-FDMA partition the overall system bandwidth into multiple (L) orthogonal subbands, which are also called subcarriers, tones, bins, and so on. Each subband is associated with a subcarrier that may be independently modulated with data. In general, modulation symbols are sent in the frequency domain with OFDM and in the time domain with SC-FDMA. For clarity, much of the description below is for a MIMO system that utilizes OFDM.

Figure 1:
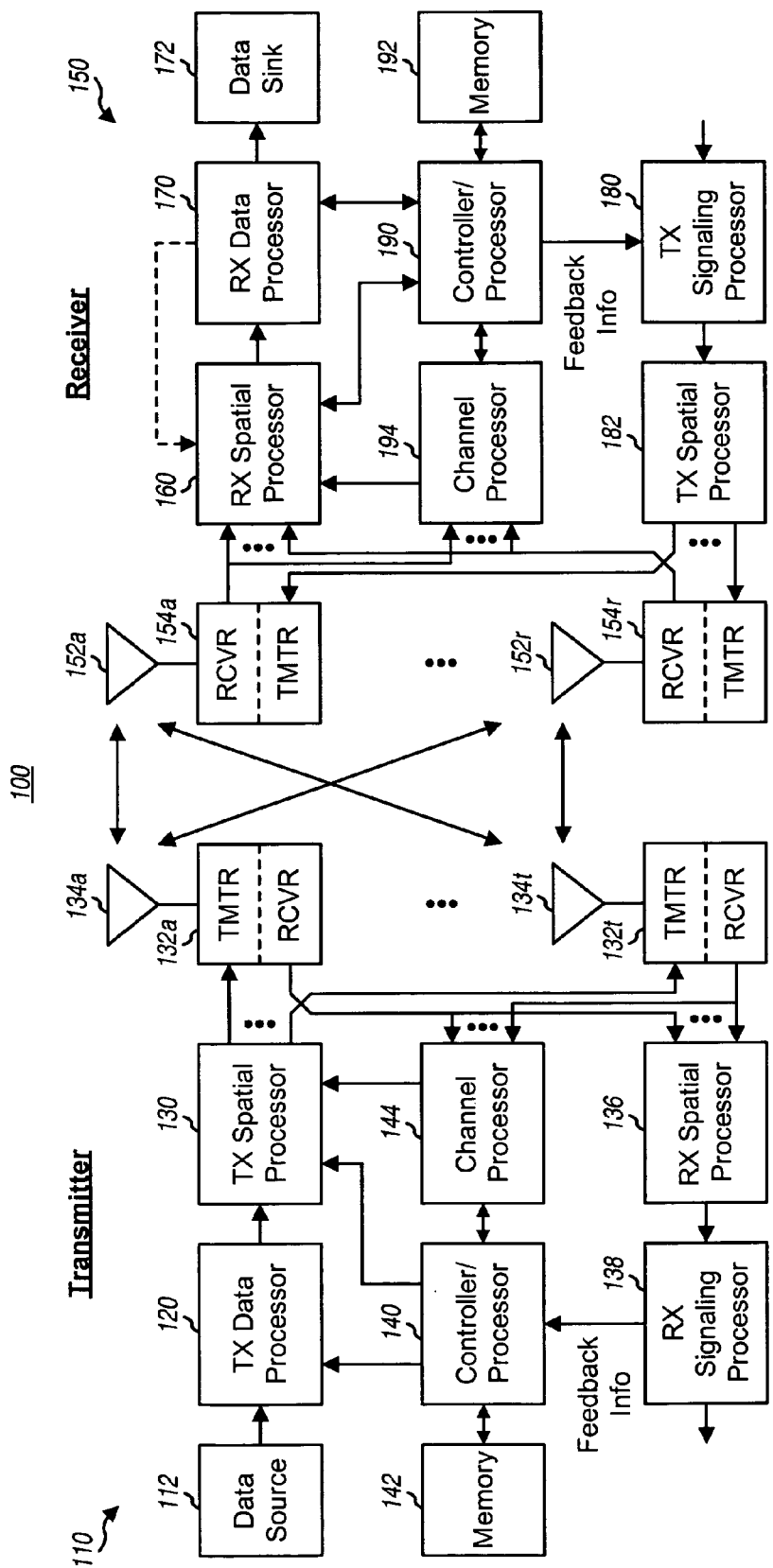
FIG. 1 shows a block diagram of a transmitter and a receiver.

FIG. 1 shows a block diagram of an embodiment of a transmitter 110 and a receiver 150 in a MIMO system 100.

Transmitter 110 is equipped with multiple (T) antennas, and receiver 150 is equipped with multiple (R) antennas. For downlink (or forward link) transmission, transmitter 110 may be part of, and may contain some or all of the functionality of, a base station, an access point, a Node B, and so on. Receiver 150 may be part of, and may contain some or all of the functionality of, a mobile station, a user terminal, a user equipment, and so on. For uplink (or reverse link) transmission, transmitter 110 may be part of a mobile station, a user terminal, a user equipment, and so on, and receiver 150 may be part of a base station, an access point, a Node B, and so on.

At transmitter 110, a TX data processor 120 receives traffic data from a data source 112 and processes (e.g., formats, encodes, interleaves, and symbol maps) the traffic data to generate data symbols, which are modulation symbols for traffic data. A TX spatial processor 130 multiplexes the data symbols with pilot symbols, which are modulation symbols for pilot. A pilot is a transmission that is known a priori by both the transmitter and receiver and may also be referred to as a training signal, a reference, a preamble, and so on. TX spatial processor 130 performs transmitter spatial processing and provides T streams of transmit symbols to T transmitter units (TMTR) 132a through 132t. Each transmitter unit 132 processes (e.g., OFDM modulates, converts to analog, filters, amplifies, and upconverts) its transmit symbol stream and generates a modulated signal. T modulated signals from transmitter units 132a through 132t are transmitted from antennas 134a through 134t, respectively.

At receiver 150, R antennas 152a through 152r receive the T modulated signals, and each antenna 152 provides a received signal to a respective receiver unit (RCVR) 154. Each receiver unit 154 processes its received signal in a manner complementary to the processing performed by transmitter units 132 to obtain received symbols, provides received symbols for traffic data to an RX spatial processor 160, and provides received symbols for pilot to a channel processor 194. Channel processor 194 estimates the response of the MIMO channel from transmitter 110 to receiver 150 based on the received symbols for pilot (and possibly the received symbols for traffic data) and provides channel estimates to RX spatial processor 160. RX spatial processor 160 performs detection on the received symbols for traffic data with the channel estimates and provides soft decisions, which may be represented by LLRs as described below. An RX data processor 170 further processes (e.g., deinterleaves and decodes) the soft decisions and provides decoded data to a data sink 172. The detection and decoding may be performed with a single pass through processors 160 and 170 or iteratively between processors 160 and 170.

Receiver 150 may send feedback information to assist transmitter 110 in controlling the data transmission to receiver 150. The feedback information may indicate a particular transmission mode to use for transmission, a particular rate or packet format to use for each data stream, acknowledgments (ACKs) and/or negative acknowledgments (NAKs) for packets decoded by receiver 150, channel state information, and so on, or any combination thereof. The feedback information is processed (e.g., encoded, interleaved, and symbol mapped) by a TX signaling processor 180, multiplexed with pilot symbols and spatially processed by a TX spatial processor 182, and further processed by transmitter units 154a through 154r to generate R modulated signals, which are transmitted via antennas 152a through 152r.

At transmitter 110, the R modulated signals are received by antennas 134a through 134t, processed by receiver units 132a through 132t, spatially processed by an RX spatial processor 136, and further processed (e.g., deinterleaved and decoded) by an RX signaling processor 138 to recover the feedback information. A controller/processor 140 controls the data transmission to receiver 150 based on the received feedback information. A channel processor 144 may estimate the response of the MIMO channel from receiver 150 to transmitter 110 and may derive spatial mapping matrices used by TX spatial processor 130.

Controllers/processors 140 and 190 control the operation at transmitter 110 and receiver 150, respectively. Memories 142 and 192 store data and program codes for transmitter 110 and receiver 150, respectively.

Figure 2:
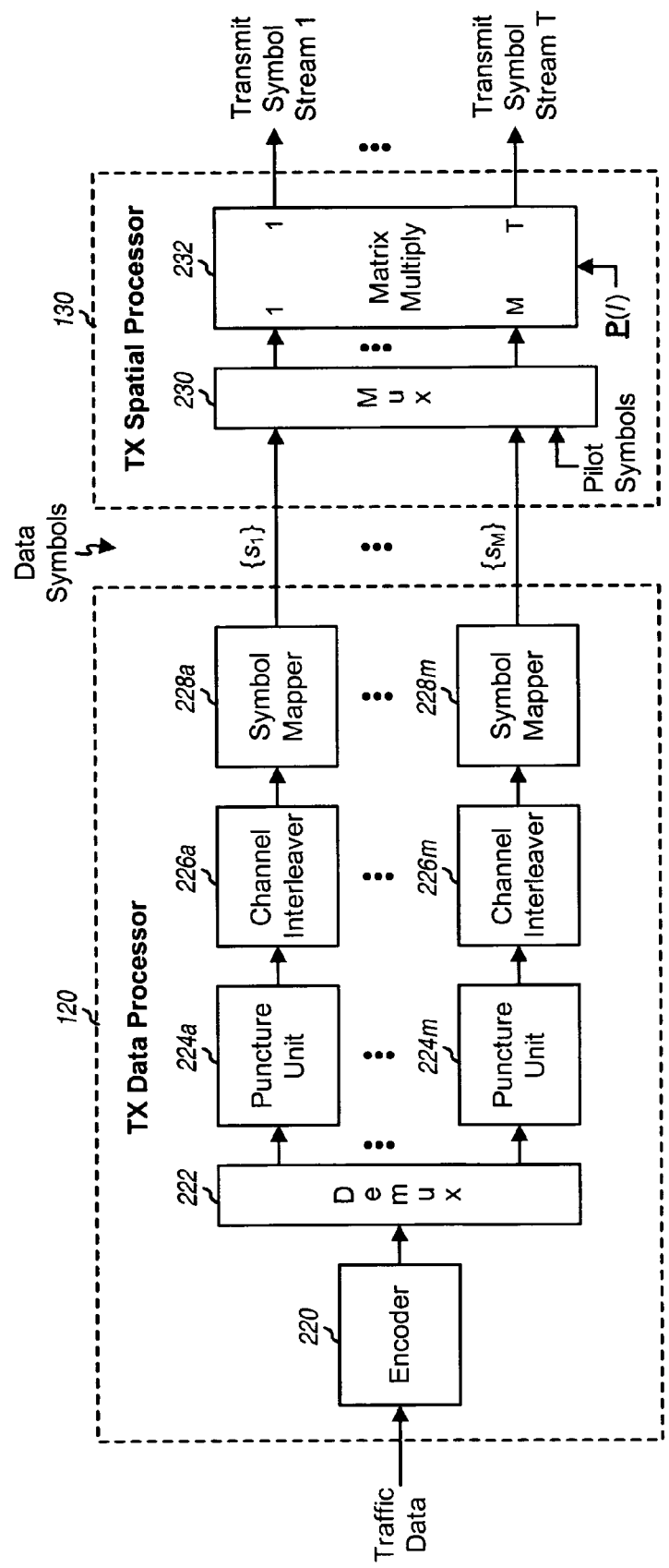
FIG. 2 shows a block diagram of a transmit (TX) data processor and a TX spatial processor at the transmitter.

FIG. 2 shows a block diagram of an embodiment of TX data processor 120 and TX spatial processor 130 at transmitter 110. For this embodiment, a common coding scheme is used for all data streams, and a separate code rate and a separate modulation scheme may be used for each data stream. For clarity, the following description assumes that M data streams are sent on M spatial channels.

Within TX data processor 120, an encoder 220 encodes traffic data in accordance with a coding scheme and generates code bits. The coding scheme may include a convolutional code, a Turbo code, a low density parity check (LDPC) code, a cyclic redundancy check (CRC) code, a block code, and so on, or a combination thereof. A demultiplexer (Demux) 222 demultiplexes (or parses) the code bits into M streams and provides the M code bit streams to M sets of processing units. Each set includes a puncture unit 224, a channel interleaver 226, and a symbol mapper 228. Each puncture unit 224 punctures (or deletes) code bits, as necessary, to achieve a code rate selected for its stream and provides the retained code bits to an associated channel interleaver 226. Each channel interleaver 226 interleaves (or reorders) its code bits based on an interleaving scheme and provides interleaved bits to an associated symbol mapper 228. The interleaving may be performed separately for each data stream (as shown in FIG. 2) or across some or all data streams (not shown in FIG. 2).

Each symbol mapper 228 maps its interleaved bits in accordance with a modulation scheme selected for its stream and provides a stream of data symbols $\{s_m\}$. The symbol mapping for stream m may be achieved by (1) grouping sets of $Q_m$ bits to form $Q_m$-bit values, where $Q_m \geq 1$, and (2) mapping each $Q_m$-bit value to one of $2^{Q_m}$ points in a signal constellation for the selected modulation scheme. Each mapped signal point is a complex value and corresponds to a data symbol. The symbol mapping may be based on Gray mapping or non-Gray mapping. With Gray mapping, neighboring points in the signal constellation (in both the horizontal and vertical directions) differ by only one out of $Q_m$ bit positions. Gray mapping reduces the number of bit errors for more likely error events, which correspond to a received symbol being mapped to a location near the correct location, in which case only one coded bit would be detected in error. With non-Gray mapping, neighboring points may differ by more than one bit position. Non-Gray mapping may result in more independence between the coded bits and may improve performance for iterative detection and decoding.

Within TX spatial processor 130, a multiplexer (Mux) 230 receives the M data symbol streams from symbol mappers 228a through 228m and maps the data symbols and pilot symbols to the proper subbands in each symbol period. A matrix multiplier 232 multiplies the data and/or pilot symbols for each subband l with a spatial mapping matrix P(l) and provides transmit symbols for that subband. Different spatial mapping matrices may be used for different transmission modes, and different spatial mapping matrices may be used for different subbands for some transmission modes, as described below.

FIG. 2 shows an embodiment in which a common coding scheme and separate code rates and modulation schemes may be used for the M data streams. Different code rates may be achieved for the M data streams by using different puncture patterns for these streams. In another embodiment, a common coding scheme and a common code rate are used for all data streams, and separate modulation schemes may be used for the M data streams. In yet another embodiment, a common coding scheme, a common code rate, and a common modulation scheme are used for all M data streams. In still yet another embodiment, each data stream is processed based on a coding and modulation scheme selected for that data stream. In general, the same or different coding schemes, the same or different code rates, and the same or different modulation schemes may be used for the M data streams. Furthermore, the same or different coding schemes, the same or different code rates, and the same or different modulation schemes may be used across the subbands.

Transmitter 110 typically encodes each packet separately. In an embodiment, the M data streams are jointly encoded so that a single packet may be sent on multiple (e.g., all M) spatial channels. In another embodiment, the M data streams are independently encoded so that each packet is sent on one spatial channel. In yet another embodiment, some data streams are jointly encoded while remaining data streams are independently encoded.

For clarity, the following description assumes that one data stream is sent on each spatial channel. The terms "data stream" and "spatial channel" are thus interchangeable for much of the description below. The number of data streams may be configurable and may be selected based on channel conditions and/or other factors. For clarity, the following description assumes that M data streams are sent on M spatial channels.

Figure 3:
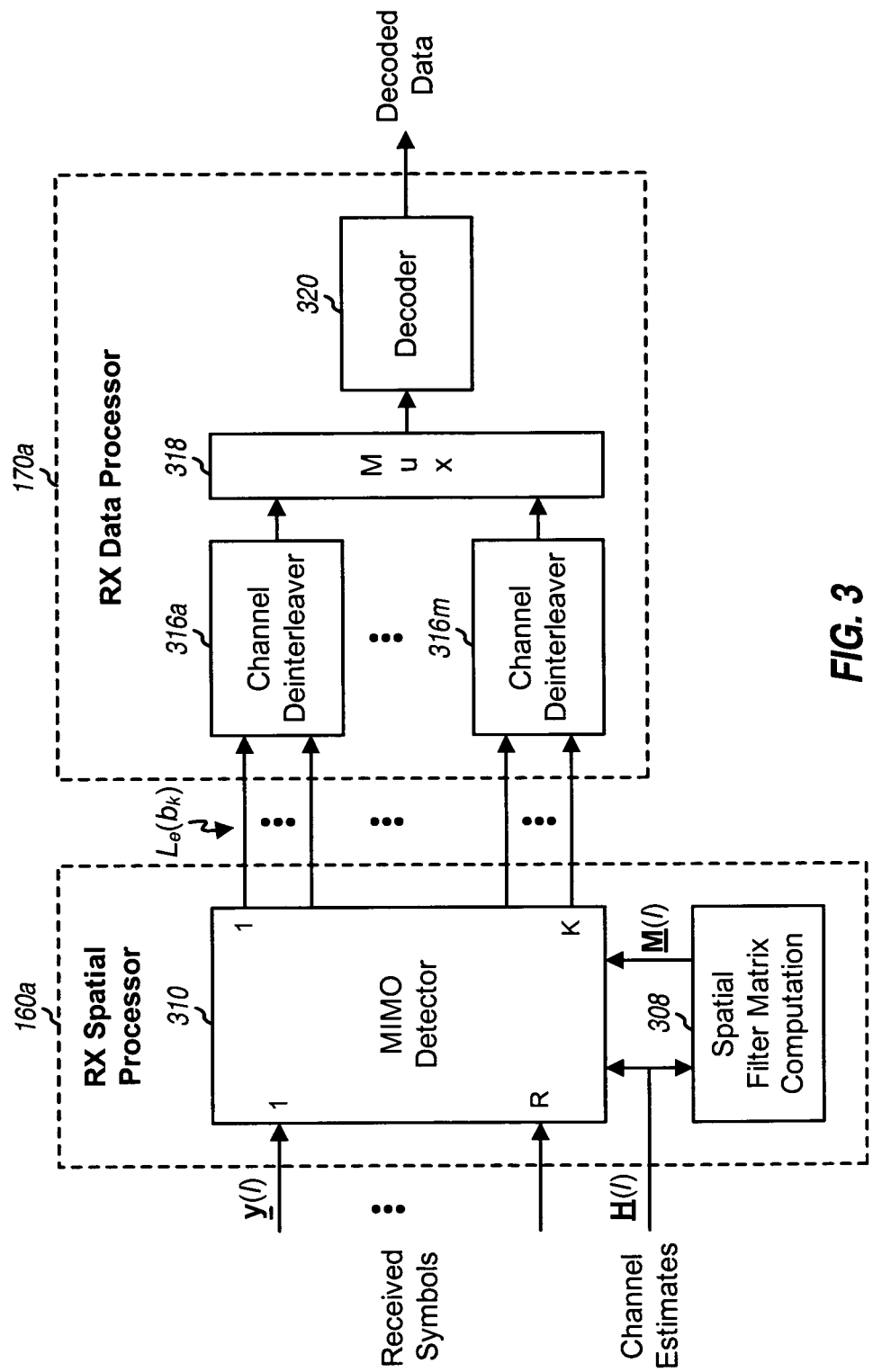
FIG. 3 shows a block diagram of a receive (RX) spatial processor and an RX data processor for a single-pass receiver.

FIG. 3 shows a block diagram of an RX spatial processor 160a and an RX data processor 170a for a single-pass receiver. Processors 160a and 170a are an embodiment of processors 160 and 170, respectively, at receiver 150 in FIG. 1. For this embodiment, processors 160a and 170a perform detection and decoding with a single pass through each of processors 160a and 170a.

Within RX spatial processor 160a, a spatial filter matrix computation unit 308 receives the channel estimates from channel processor 194 and derives spatial filter matrices based on the channel estimates and the spatial mapping matrices used by transmitter 110, as described below. A MIMO detector 310 obtains the received symbols from R receiver units 154a through 154r, the channel estimates from channel processor 194, and the spatial filter matrices from unit 308. MIMO detector 310 performs detection as described below and provides K soft decisions for K code bits of M data symbols sent on each subband in each symbol period used for data transmission. A soft decision is a multi-bit value that is an estimate of a transmitted code bit. The soft decisions may be represented as LLRs and may be referred to as extrinsic LLRs. If M data symbols are sent on one subband in one symbol period, then K may be computed as $$K = \sum_{m=1}^{M} Q_m,$$

where $Q_m$ is the number of code bits used to form a data symbol for stream m. If the same modulation scheme is used for all M data streams, then K may be computed as $K = M \cdot Q$, where Q is the number of code bits for each data symbol.

Within RX data processor 170a, channel deinterleavers 316a through 316m receive the extrinsic LLRs for the M streams. Each channel deinterleaver 316 deinterleaves the extrinsic LLRs for its stream in a manner complementary to the interleaving performed by channel interleaver 226 for that stream. A multiplexer 318 multiplexes (or serializes) the deinterleaved LLRs from channel deinterleavers 316a through 316m. A decoder 320 decodes the deinterleaved LLRs and provides decoded data. The detection and decoding are described in detail below.

Figure 4:
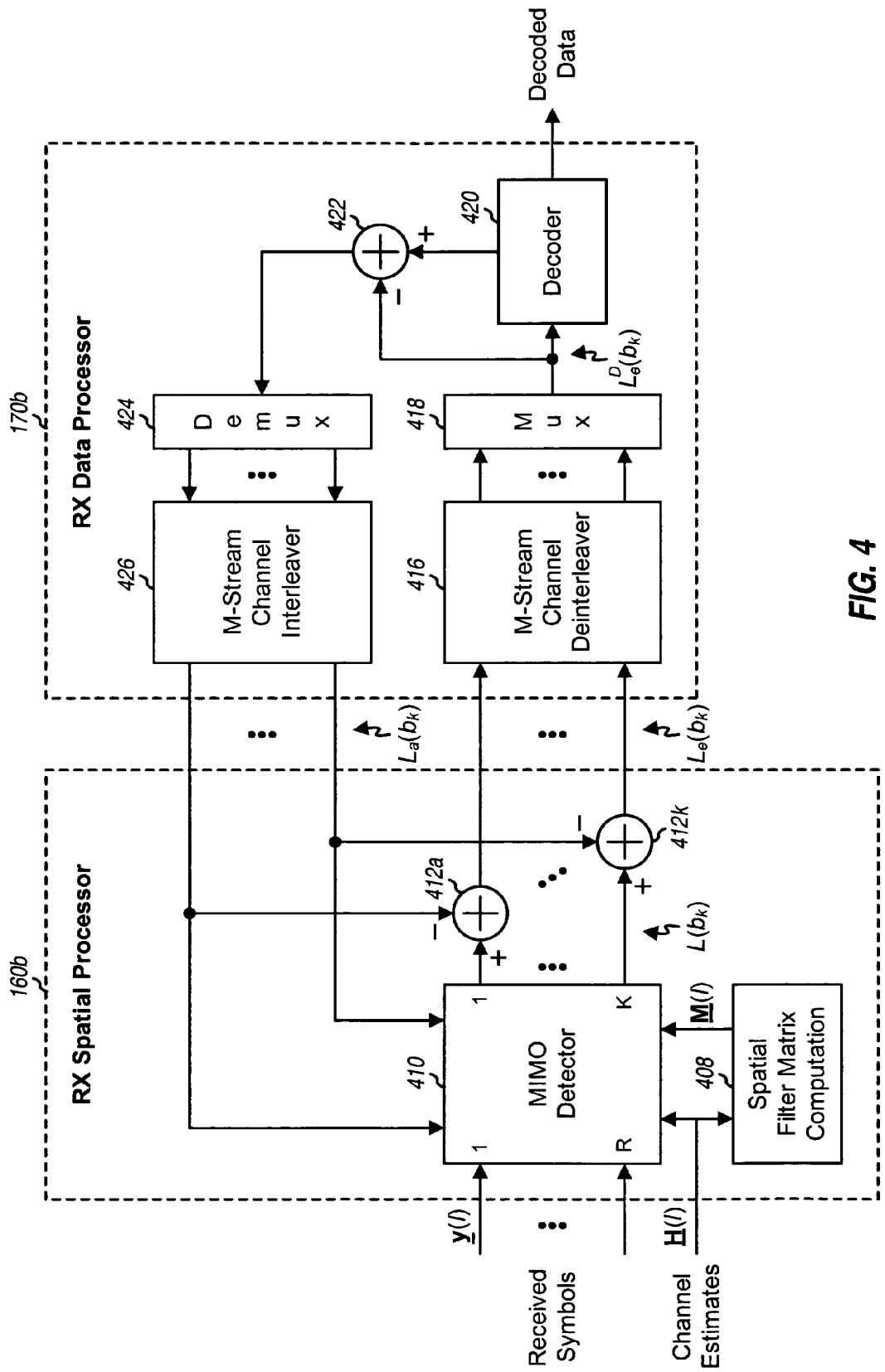
FIG. 4 shows a block diagram of an RX spatial processor and an RX data processor for an iterative receiver.

FIG. 4 shows a block diagram of an RX spatial processor 160b and an RX data processor 170b for an iterative receiver. Processors 160b and 170b are another embodiment of processors 160 and 170, respectively, at receiver 150. For this embodiment, processors 160b and 170b perform detection and decoding iteratively.

Within RX spatial processor 160b, a unit 408 derives spatial filter matrices based on the channel estimates and the spatial mapping matrices used by transmitter 110. A MIMO detector 410 obtains the received symbols from R receiver units 154a through 154r, the channel estimates from channel processor 194, the spatial filter matrices from unit 408, and a priori LLRs from a decoder 420. The a priori LLRs are denoted as $L_a(b_k)$ and represent a priori information from decoder 420. MIMO detector 410 performs detection as described below and provides K detector LLRs for K code bits of M data symbols sent on each subband in each symbol period used for data transmission. The detector LLRs are denoted as $L(b_k)$. K summers 412a through 412k subtract the a priori LLRs from the detector LLRs and provide extrinsic LLRs, which are denoted as $L_e(b_k)$. The extrinsic LLRs represent extrinsic or new information from MIMO detector 410 to decoder 420.

Within RX data processor 170b, an M-stream channel deinterleaver 416 deinterleaves the extrinsic LLRs for each stream in a manner complementary to the interleaving performed by channel interleaver 226 for that stream. Channel deinterleaver 416 may include M channel deinterleavers 316a through 316m shown in FIG. 3. A multiplexer 418 serializes the deinterleaved LLRs, which are denoted as $L_e^D(b_k)$. A decoder 420 decodes the deinterleaved LLRs and provides decoder LLRs. A summer 422 subtracts the deinterleaved LLRs from the decoder LLRs and provides a priori LLRs, which represent extrinsic information from decoder 420 to MIMO detector 410 for the next iteration. The a priori LLRs for MIMO detector 410 are demultiplexed into M streams by a demultiplexer 424. An M-stream channel interleaver 426 interleaves the a priori LLRs for each stream in the same manner performed by channel interleaver 226 for that stream. Channel interleaver 426 may include M channel interleavers 226a through 226m shown in FIG. 2. Channel interleaver 426 provides the interleaved a priori LLRs for the next iteration to MIMO detector 410.

RX spatial processor 160b and RX data processor 170b may perform any number of iterations. In an embodiment, processors 160b and 170b perform a predetermined number of iterations (e.g., 4, 6, 8 or more iterations). In another embodiment, processors 160b and 170b perform one iteration, then check if a packet is decoded correctly and/or if a decoder reliability metric is sufficiently high, and perform another iteration if the packet is decoded in error or if the decoder reliability metric is low. The error detection may be achieved with a CRC and/or some other error detection code. Processors 160b and 170b may thus perform a fixed number of iterations or a variable number of iterations up to some maximum number of iterations. The iterative detection and decoding is described in detail below.

The received symbols at receiver 150 may be expressed as:

$$y(l)=H_{ch}(l)\cdot P(l)\cdot \underline{s}(l)+n(l)=H(l)\cdot \underline{s}(l)+n(l), \text{ for } l=1,\ldots,L, \quad \text{Eq (1)}$$

where
- $\underline{s}(l)$ is an M×1 vector with M data symbols sent on subband l;
- $P(l)$ is a T×M spatial mapping matrix used by transmitter 110 for subband l;
- $H_{ch}(l)$ is an R×T MIMO channel response matrix for subband l;
- $H(l)=H_{ch}(l)\cdot P(l)$ is an R×M effective MIMO channel response matrix for subband l;
- $y(l)$ is an R×1 vector with R received symbols for subband l; and
- $n(l)$ is an R×1 vector of noise for subband l.

The noise may be assumed to be additive white Gaussian noise (AWGN) with a zero mean vector and a covariance matrix of $\sigma_n^2 \cdot I$, where $\sigma_n^2$ is the variance of the noise and I is the identity matrix. The effective MIMO channel response $H(l)$ includes the actual MIMO channel response $H_{ch}(l)$ and the spatial mapping matrix $P(l)$ used by transmitter 110.

In an embodiment, a MIMO detector (e.g., MIMO detector 310 or 410) performs detection separately for each subband based on the received symbols and the channel estimate for that subband and, if available, the a priori LLRs for the data symbols sent on that subband. In another embodiment, the MIMO detector performs detection jointly for multiple subbands. A decoder (e.g., decoder 320 or 420) performs decoding on a sequence of LLRs for a packet, which may be transmitted on one or multiple subbands. For clarity, subband index l is omitted in the following description.

A packet may be partitioned into multiple blocks, with each block containing K code bits. The K code bits for each block may be mapped to M data symbols, as follows:

$$\underline{s}=\text{map}(\underline{b}), \quad \text{Eq (2)}$$

where
$\underline{s}=[s_1 \; s_2 \; \ldots \; s_M]$ is a vector with M data symbols;

$$\underline{b} = [\underline{b}_1 \; \underline{b}_2 \; \ldots \; \underline{b}_M]$$
$$= \left[ \underbrace{b_{1,1}\ldots b_{1,Q_1}}_{\underline{b}_1} \; \underbrace{b_{2,1}\ldots b_{2,Q_2}}_{\underline{b}_2} \; \ldots \; \underbrace{b_{M,1}\ldots b_{M,Q_M}}_{\underline{b}_M} \right]$$
$$= [b_1 \; b_2 \; \ldots \; b_K]$$

is a vector with K code bits for one block;
$\underline{b}_m$ is a vector with $Q_m$ code bits used to form data symbol $s_m$ for stream m;
$b_{m,q}$, for m=1,...,M and q=1,...,$Q_m$, is the q-th code bit in vector $\underline{b}_m$; and
$b_k$, for k=1,...,K, is the k-th code bit in vector b.

There is a one-to-one mapping between a given bit vector b and a corresponding data vector s. In general, Q may be the same or different for the M data symbols sent on a given subband, and K may be the same or different for the L subbands.

An optimal receiver for the transmission scheme shown in equation (1) is a maximum likelihood (ML) sequence receiver that performs detection and decoding jointly for an entire packet. This optimal receiver would make joint decisions on all data bits in the packet using knowledge of the correlation introduced by the coding scheme across the blocks, subbands, and OFDM symbols for the packet. The optimal receiver would perform an exhaustive search over all possible sequences of data bits that might have been transmitted for the packet to find the sequence that is most likely to have been transmitted. This optimal receiver would be prohibitively complex.

A receiver that performs detection and decoding iteratively, e.g., as shown in FIG. 4, can achieve near-optimal performance with lower complexity. The detector and decoder compute soft decisions on the code bits and exchange this information in an iterative manner, which increases the reliability of the soft decisions with the number of iterations performed. The MIMO detector and decoder may each be implemented in various manners.

In an embodiment, the MIMO detector is a maximum a posteriori probability (MAP) detector that minimizes the error probability for each code bit and provides a soft decision for each code bit. The MAP detector provides soft decisions in the form of a posteriori probabilities (APPs) that are often expressed as LLRs. The detector LLR for code bit $b_k$, $L(b_k)$, may be expressed as:

$$L(b_k) = \ln \frac{P\{b_k = +1 | \underline{y}\}}{P\{b_k = -1 | \underline{y}\}}, \quad \text{for } k = 1, \ldots, K, \quad \text{Eq (3)}$$

where $P\{b_k=+1|y\}$ is the probability of code bit $b_k$ being +1 given received vector y; and
$P\{b_k=-1|y\}$ is the probability of code bit $b_k$ being −1 given received vector y, The detector LLR may be separated into two parts, as follows:

$$L(b_k)=L_a(b_k)+L_e(b_k) \quad \text{Eq (4)}$$

where $L_a(b_k)$ is the a priori LLR for code bit $b_k$ provided by the decoder or possibly other sources to the MIMO detector and $L_e(b_k)$ is the extrinsic LLR for code bit $b_k$ provided by the MIMO detector to the decoder. The a priori LLR for code bit $b_k$ may be expressed as:

$$L_a(b_k) = \ln \frac{P\{b_k = +1\}}{P\{b_k = -1\}}, \quad \text{Eq (5)}$$

where $P\{b_k=+1\}$ is the probability of code bit $b_k$ being +1; and
$P\{b_k=-1\}$ is the probability of code bit $b_k$ being −1.

The MAP detector may be a log-MAP detector, a max-log-MAP detector, or some other type of MAP detector. The extrinsic LLR from a log-MAP detector, which is called a log-MAP LLR, may be computed as:

$$L_e(b_k) = \ln \frac{\sum_{\tilde{b}:b_k=+1} -\frac{1}{2\sigma_n^2}\cdot\|\underline{y}-H\cdot\tilde{\underline{s}}\|^2 \cdot \exp\left(\frac{1}{2}\tilde{\underline{b}}_{[k]}^T \cdot L_{a,[k]}\right)}{\sum_{\tilde{b}:b_k=+1} -\frac{1}{2\sigma_n^2}\cdot\|\underline{y}-H\cdot\tilde{\underline{s}}\|^2 \cdot \exp\left(\frac{1}{2}\tilde{\underline{b}}_{[k]}^T \cdot L_{a,[k]}\right)}, \quad \text{Eq (6)}$$

where
$\tilde{b}$ and $\tilde{s}$ are vectors that are hypothesized to have been transmitted;
$\tilde{\underline{b}}_{[k]}$ is a vector with all code bits in vector $\tilde{b}$ except for code bit $b_k$;
$L_{a,[k]}$ is a vector with a priori LLRs for all code bits in $\tilde{\underline{b}}_{[k]}$;
$\|\underline{y}-H\cdot\tilde{\underline{s}}\|^2$ represents a Euclidean distance cost function; and
"T" denotes a transpose.

Equation (6) shows one expression for the extrinsic LLR from the log-MAP detector. The extrinsic LLR may also be expressed in other forms. The receiver typically derives $\hat{H}$, which is an estimate of the effective MIMO channel response matrix H, and uses $\hat{H}$ in the LLR computation. For simplicity, the description herein assumes no channel estimation error, so that $\hat{H}=H$.

Equation (6) is evaluated for each code bit in the transmitted bit vector b. For each code bit $b_k$, $2^K$ hypothesized bit vectors $\tilde{b}$ for all possible sequences of code bits $\{b_1 \ldots b_K\}$ (or all possible combinations of code bit values) that might have been transmitted for vector b are considered. $2^{K-1}$ hypothesized bit vectors $\tilde{b}$ have $b_k=+1$, and the other $2^{K-1}$ hypothesized bit vectors $\tilde{b}$ have $b_k=-1$. Each hypothesized bit vector $\tilde{b}$ has a corresponding hypothesized data vector $\tilde{s}$. The expression within the summation is computed for each hypothesized bit vector $\tilde{b}$ to obtain a result for that bit vector. The results for the $2^{K-1}$ hypothesized bit vectors $\tilde{b}$ with $b_k=+1$ are summed to obtain a total result for the numerator. The results for the $2^{K-1}$ hypothesized bit vectors $\tilde{b}$ with $b_k=-1$ are summed to obtain a total result for the denominator. The log-MAP LLR for code bit $b_k$ is equal to the natural logarithm (ln) of the total result for the numerator divided by the total result for the denominator.

A max-log-MAP detector approximates the log-MAP LLR in equation (6) and provides a max-log-MAP LLR, as follows:

$$L_e(b_k) \approx \frac{1}{2} \max_{\tilde{b}: b_k=+1} \left\{ -\frac{1}{\sigma_n^2} \cdot \|\underline{y} - \underline{H} \cdot \tilde{\underline{s}}\|^2 + \tilde{\underline{b}}_{[k]}^T \cdot \underline{L}_{a,[k]} \right\} - \frac{1}{2} \max_{\tilde{b}: b_k=-1} \left\{ -\frac{1}{\sigma_n^2} \cdot \|\underline{y} - \underline{H} \cdot \tilde{\underline{s}}\|^2 + \tilde{\underline{b}}_{[k]}^T \cdot \underline{L}_{a,[k]} \right\}. \quad \text{Eq (7)}$$

The max-log-MAP approximation in equation (7) replaces the summations in equation (6) with max { } operations. Only a small degradation in performance typically results from using the max-log-MAP approximation. Other approximations of the log-MAP LLR in equation (6) may also be used.

The log-MAP detector in equation (6) and the max-log-MAP detector in equation (7) make joint decisions on the received symbols in vector y and compute extrinsic LLRs for the code bits associated with these received symbols. In order to compute the extrinsic LLRs optimally, each MAP detector performs an exhaustive search over all possible combinations of data symbols that might have been transmitted for vector s. This exhaustive search is computationally intensive and may be prohibitive for many applications. The complexity of the LLR computation is exponential in the number of bits (K) in the transmitted bit vector b for both the log-MAP and max-log-MAP detectors. In particular, $2^K$ hypotheses are considered by both MAP detectors for each code bit $b_k$. Various detection schemes with reduced complexity are described below.

To reduce computational complexity, the receiver may perform receiver spatial processing (or spatial matched filtering) on the received symbols to obtain detected symbols and may then perform LLR computation independently for each detected symbol. The detected symbols are estimates of the data symbols transmitted by the transmitter. The receiver may perform receiver spatial processing based on a zero-forcing (ZF) technique, a minimum mean square error (MMSE) technique, a maximal ratio combining (MRC) technique, or some other technique. A spatial filter matrix may be derived based on the ZF, MMSE, or MRC technique, as follows:

$$\underline{M}_{zf} = [\underline{H}^H \cdot \underline{H}]^{-1} \cdot \underline{H}^H, \quad \text{Eq (8)}$$

$$\underline{M}_{mmse} = \underline{D}_{mmse} \cdot [\underline{H}^H \cdot \underline{H} + \sigma_n^2 \cdot \underline{I}]^{-1} \cdot \underline{H}^H, \quad \text{Eq (9)}$$

$$\underline{M}_{mrc} = \underline{D}_{mrc} \cdot \underline{H}^H, \quad \text{Eq (10)}$$

where $\underline{D}_{mmse} = \text{diag} \{[\underline{H}^H \cdot \underline{H} + \sigma_n^2 \cdot \underline{I}]^{-1} \cdot \underline{H}^H \cdot \underline{H}\}^{-1}$;
$\underline{D}_{mrc} = \text{diag} [\underline{H}^H \cdot \underline{H}]^{-1}$;
$\underline{M}_{zf}$, $\underline{M}_{mmse}$ and $\underline{M}_{mrc}$ are M×R spatial filter matrices for the ZF, MMSE, and MRC techniques, respectively; and
"$H$" denotes a conjugate transpose.

The receiver spatial processing may be expressed as:

$$\underline{\hat{s}} = \underline{M} \cdot \underline{y}, \quad \text{Eq (11)}$$

where $\underline{M}$ may be equal to $\underline{M}_{zf}$, $\underline{M}_{mmse}$ or $\underline{M}_{mrc}$; and
$\underline{\hat{s}}$ is an M×1 vector of detected symbols and is an estimate of data vector s.

LLR computation may be performed independently for each detected symbol. The extrinsic LLRs may be computed for the $Q_m$ code bits of each detected symbol $\hat{s}_m$ with the max-log-MAP detector, as follows:

$$L_e(b_{m,q}) \approx \frac{1}{2} \max_{\tilde{b}_m: b_{m,q}=+1} \left\{ -\frac{1}{\sigma^2} \cdot |\hat{s}_m - \tilde{s}_m|^2 + \tilde{\underline{b}}_{m,[q]}^T \cdot \underline{L}_{a,m,[q]} \right\} - \frac{1}{2} \max_{\tilde{b}_m: b_{m,q}=-1} \left\{ -\frac{1}{\sigma^2} \cdot |\hat{s}_m - \tilde{s}_m|^2 + \tilde{\underline{b}}_{m,[q]}^T \cdot \underline{L}_{a,m,[q]} \right\}. \quad \text{Eq (12)}$$

where $\hat{s}_m$ is the m-th element of $\underline{\hat{s}}$;
$\tilde{s}_m$ is a hypothesized data symbol for transmitted data symbol $s_m$;
$\tilde{\underline{b}}_{m,[q]}$ is a vector with all code bits for data symbol $s_m$ except for code bit $b_{m,q}$;
$\underline{L}_{a,m,[q]}$ is a vector with a priori LLRs for all code bits in $\tilde{\underline{b}}_{m,[q]}$; and
$L_e(b_{m,q})$ is the extrinsic LLR for code bit $b_{m,q}$.

Equation (12) is evaluated for each code bit in each transmitted bit vector $b_m$, for m=1, ..., M. For each code bit $b_{m,q}$ in bit vector $b_m$, $2^{Q_m}$ hypothesized bit vectors $\tilde{b}_m$ for all possible sequences of code bits $\{b_{m,1} \ldots b_{m,Q_m}\}$ that might have been transmitted for vector $b_m$ are considered. Each hypothesized bit vector $\tilde{b}_m$ has a corresponding hypothesized data symbol $\tilde{s}_m$. The expression within the max { } operation is computed for each hypothesized bit vector $\tilde{b}_m$ to obtain a result for that vector. The results for the $2^{Q_m-1}$ hypothesized bit vectors $\tilde{b}_m$ with $b_{m,q}=+1$ are used in the first max { } operation. The results for the $2^{Q_m-1}$ hypothesized bit vectors $\tilde{b}_m$ with $b_{m,q}=-1$ are used in the second max { } operation.

The complexity of the receiver spatial processing is linear in the number of data streams (M) and is not dependent on the signal constellation size. Computing the extrinsic LLRs on a per-stream basis reduces the number of hypotheses to evaluate from $2^{M \cdot Q}$ to $M \cdot 2^Q$, assuming that the same modulation scheme is used for all M data streams. The per-stream LLR computation may substantially reduce computational complexity but may result in higher performance degradation than desired.

In an aspect, the receiver performs receiver spatial processing on the received symbols to obtain detected symbols, performs LLR computation independently for each of D best detected symbols, and performs LLR computation jointly for the M−D remaining detected symbols, where M>D≧1. The D best detected symbols may be for the D data streams with the highest SNRs, the D data streams with the smallest SNR variation, the D data streams with the most robust coding, and so on. This detection scheme is referred to as a reduced dimensionality detection scheme and may be used for the single-pass receiver shown in FIG. 3 and the iterative receiver shown in FIG. 4.

The receiver may perform receiver spatial processing on the R received symbols to obtain the D best detected symbols (instead of all M detected symbols). A reduced spatial filter matrix $M_D$ of dimension D×R may be derived based on a reduced channel response matrix $H_D$. Matrix $H_D$ has dimension of R×D and includes D columns of H corresponding to the D best detected symbols. The receiver spatial processing for the D best detected symbols is less computationally complex.

The receiver may perform LLR computation independently for each of the D best detected symbols, e.g., based on the max-log-MAP detector shown in equation (12) or some other type of detector. The receiver may perform joint LLR computation for the M−D remaining detected symbols in various manners.

In one embodiment, the receiver performs joint LLR computation for the remaining detected symbols by considering the D best detected symbols. For this embodiment, hard decisions are made on the D best detected symbols. A hard decision $\bar{s}_m$ for a given detected symbol $\hat{s}_m$ is a modulation symbol that is closest in distance to $\hat{s}_m$ from among all modulation symbols in the signal constellation used for $\hat{s}_m$. The receiver then computes extrinsic LLRs for the code bits for the remaining detected symbols, e.g., based on the max-log-MAP detector shown in equation (7) or some other type of detector. For this LLR computation, the D best detected symbols are constrained or fixed to the hard decisions determined for these detected symbols. Hence, the number of hypotheses to evaluate is reduced from $$2^{\sum_{m=1}^{M} Q_m} \text{ to } 2^{\sum_{m=1}^{M-D} Q_m},$$

assuming that the D best detected symbols have indices of m=M−D+1, ..., M.

In another embodiment, the receiver performs joint LLR computation for the remaining detected symbols without considering the D best detected symbols. For this embodiment, the receiver forms reduced vectors for $\tilde{b}$, $\tilde{s}$, $\underline{L}_{a,[k]}$ and $\tilde{b}_{[k]}$ as well as a reduced matrix for H. The reduced vectors and matrix include only elements corresponding to the remaining detected symbols. The receiver then computes extrinsic LLRs for the code bits for the remaining detected symbols, e.g., based on the max-log-MAP detector shown in equation (7) or some other type of detector. The reduced vectors and matrix are used for the LLR computation. Hence, the number of hypotheses to evaluate and the computation for each hypothesis are both reduced.

In an embodiment, D is a fixed value that may be selected based on a tradeoff between complexity, performance, and/or other considerations. In another embodiment, D is a configurable value that may be selected based on the selected transmission mode, the channel conditions (e.g., the SNRs for the data streams) and/or other factors. D may be adaptive and may be selected per packet, per frame, per subband, or in some other manner.

The reduced dimensionality detection scheme may provide good performance with less complexity than the exhaustive detection scheme shown in equations (6) and (7). The reduced dimensionality detection scheme may be well suited for a data transmission in which some data streams observe high SNRs and/or low frequency selectivity and the remaining data streams observe lower SNRs and/or greater frequency selectivity. Frequency selectivity refers to variation in channel gains across frequency, which results in SNR variation across frequency. The reduced dimensionality detection scheme takes advantage of the high SNRs and/or low frequency selectivity for the D best data streams to reduce computational complexity. Near optimal detection is performed on the remaining data streams with lower SNRs and/or greater frequency selectivity to improve performance over a detection scheme that performs per-stream LLR computation for all M data streams.

Figure 5:
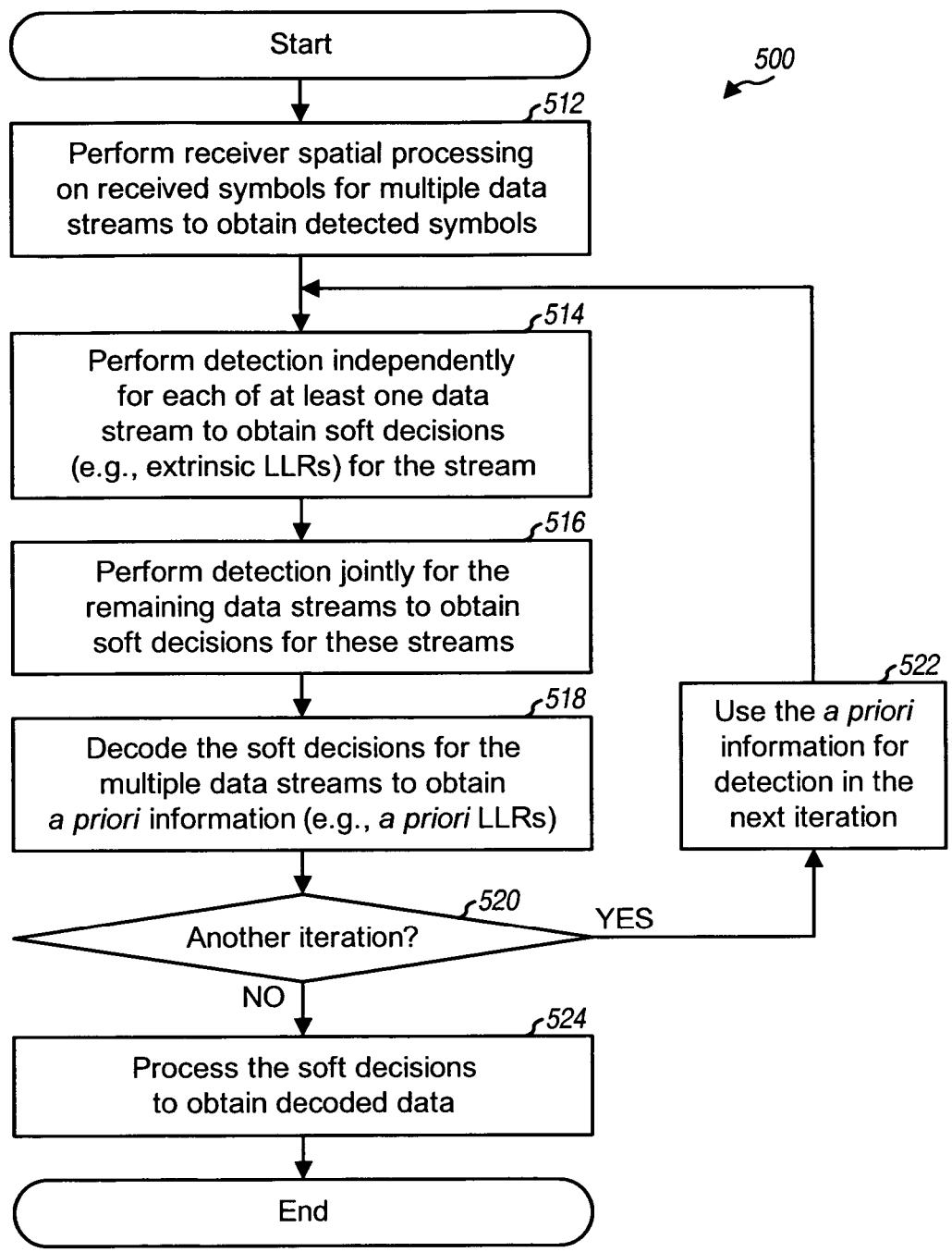
FIG. 5 shows a flow diagram for a reduced dimensionality detection scheme.

FIG. 5 shows a process 500 for performing detection and decoding based on the reduced dimensionality detection scheme. Receiver spatial processing is performed on received symbols for multiple data streams (e.g., based on the zero-forcing or MMSE technique) to obtain detected symbols (block 512). Detection is performed independently for each of at least one data stream to obtain soft decisions for the stream (block 514). Detection is performed jointly for the remaining data streams to obtain soft decisions for these streams (block 516). The soft decisions (e.g., extrinsic LLRs) for each of the at least one data stream may be derived independently based on the detected symbols and a priori information (e.g., a priori LLRs) from the decoder, if any, for that stream. The soft decisions for the remaining data streams may be derived jointly based on the received symbols and the a priori information, if any. The soft decisions for the multiple data streams may be decoded to obtain a priori information for the detector (block 518).

A determination is then made whether to perform another iteration of detection and decoding (block 520). The answer for block 520 is 'No' after one iteration for a single-pass receiver and is also 'No' for an iterative receiver if a termination condition is encountered. If the answer is 'Yes' for block 520, then the a priori information is used for detection in the next iteration (block 522), and the process returns to block 514. Otherwise, the soft decisions from the detector are further processed to obtain decoded data (block 524). The soft decisions may also be decoded prior to block 520, and the result of the decoding may be used in block 520 to determine whether or not to perform another iteration.

A packet may be encoded and demultiplexed into multiple subpackets that may be sent on the multiple data streams. A CRC may be used for each subpacket or each data stream. In this case, the CRC for each detected data stream may be checked after block 514, and the subsequent processing may be terminated if the CRC fails for any of the data stream(s) detected in block 514.

Figure 6:
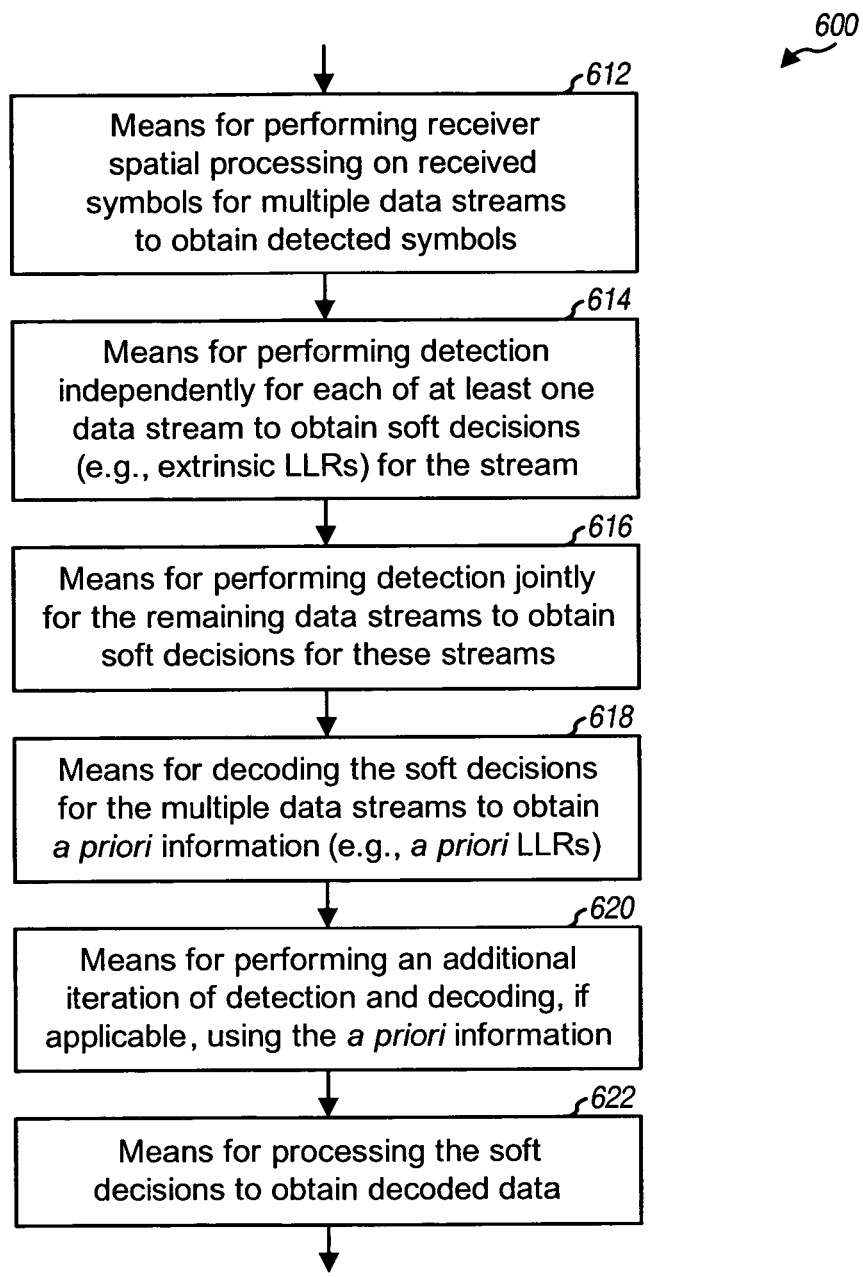
FIG. 6 shows an apparatus for the reduced dimensionality detection scheme.

FIG. 6 shows an apparatus 600 for performing detection and decoding based on the reduced dimensionality detection scheme. Apparatus 600 includes means for performing receiver spatial processing on received symbols for multiple data streams to obtain detected symbols (block 612), means for performing detection independently for each of at least one data stream to obtain soft decisions for the stream (block 614), means for performing detection jointly for the remaining data streams to obtain soft decisions for these streams (block 616), means for decoding the soft decisions for the multiple data streams to obtain a priori information (block 618), means for performing an additional iteration of detection and decoding, if applicable, using the a priori information (block 620), and means for processing the soft decisions to obtain decoded data (block 622).

The number of hypotheses to consider in the joint LLR computation may be reduced by performing a search for candidate hypotheses using list sphere detection (LSD), which is also referred to as sphere decoding, spherical decoding, and so on. List sphere detection may be used to reduce complexity for the log-MAP detector in equation (6), the max-log-MAP detector in equation (7), and other types of detector. List sphere detection seeks to reduce the search space of the detector by discarding less likely hypotheses based on a cost function. As an example, the log-MAP and max-log-MAP detectors may consider only hypotheses that satisfy the following condition:

$$\|\underline{y} - H \cdot \underline{\tilde{s}}\|^2 \leq r^2, \quad \text{Eq (13)}$$

where $\|\underline{y} - H \cdot \underline{\tilde{s}}\|^2$ is the cost function and $r^2$ is a sphere radius or threshold used to retain or discard hypotheses from consideration.

The cost function in equation (13) may be expanded, as follows:

$$\begin{aligned} J(\underline{\tilde{s}}) &= \|\underline{y} - H \cdot \underline{\tilde{s}}\|^2 \\ &= \|H \cdot \underline{s} + \underline{n} - H \cdot \underline{\tilde{s}}\|^2 \\ &= \|H \cdot (\underline{s} - \underline{\tilde{s}}) + \underline{n}\|^2 \\ &= [H \cdot (\underline{s} - \underline{\tilde{s}}) + \underline{n}]^H \cdot [H \cdot (\underline{s} - \underline{\tilde{s}}) + \underline{n}] \\ &= (\underline{s} - \underline{\tilde{s}})^H \cdot H^H \cdot H \cdot (\underline{s} - \underline{\tilde{s}}) + C \\ &= (\underline{s} - \underline{\tilde{s}})^H \cdot \underline{R}^H \cdot \underline{R} \cdot (\underline{s} - \underline{\tilde{s}}) + C \end{aligned} \quad \text{Eq (14)}$$

where $\underline{R}$ is an upper-triangular matrix obtained from QR decomposition of $H$; and C is a constant, which may be omitted since it is not a function of $\underline{\tilde{s}}$.

QR decomposition may be performed on the effective MIMO channel response matrix $H$ to obtain an orthonormal matrix $Q$ and an upper triangular matrix $\underline{R}$, or $H = Q \cdot \underline{R}$ where $Q^H \cdot Q = \underline{I}$. The upper triangular matrix $\underline{R}$ contains zeros below the main diagonal. The fourth equality in equation (14) may be obtained based on the following: $H^H \cdot H = [Q \cdot \underline{R}]^H \cdot Q \cdot \underline{R} = \underline{R}^H \cdot Q^H \cdot Q \cdot \underline{R} = \underline{R}^H \cdot \underline{R}$.

For the cost function in equation (14), the detected symbols may be used as the center point for the search. The cost function may then be expressed as:

$$J(\underline{\tilde{s}}) = \|\underline{R} \cdot (\underline{\hat{s}} - \underline{\tilde{s}})\|^2, \quad \text{Eq (15)}$$

where $\underline{\hat{s}}$ may be obtained from equation (11) based on any receiver spatial processing technique (e.g., zero-forcing or MMSE). The cost function in equation (15) may be computed for $2^K$ hypothesized data vectors $\underline{\tilde{s}}$ that might have been transmitted for vector $\underline{s}$ to obtain $2^K$ cost values for these $2^K$ hypotheses. The hypothesized data vectors with cost values that are less than or equal to $r^2$ may be considered for LLR computation, e.g., in equation (6) or (7).

The structure of the upper triangular matrix $\underline{R}$ may be exploited to reduce the number of hypotheses for which to compute the cost function. Equation (15) may be expanded as follows:

$$J = \left\| \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \end{bmatrix} \cdot \begin{bmatrix} (\hat{s}_1 - \tilde{s}_1) \\ (\hat{s}_2 - \tilde{s}_2) \\ \vdots \\ (\hat{s}_M - \tilde{s}_M) \end{bmatrix} \right\|^2 \quad \text{Eq (16)}$$

For $M=4$, equation (16) may be expressed as:

$$J = T_1 + T_2 + T_3 + T_4, \quad \text{Eq (17)}$$

where $T_1 = |r_{1,1} \cdot (\hat{s}_1 - \tilde{s}_1) + r_{1,2} \cdot (\hat{s}_2 - \tilde{s}_2) + r_{1,3} \cdot (\hat{s}_3 - \tilde{s}_3) + r_{1,4} \cdot (\hat{s}_4 - \tilde{s}_4)|^2$,
$T_2 = |r_{2,2} \cdot (\hat{s}_2 - \tilde{s}_2) + r_{2,3} \cdot (\hat{s}_3 - \tilde{s}_3) + r_{2,4} \cdot (\hat{s}_4 - \tilde{s}_4)|^2$,
$T_3 = |r_{3,3} \cdot (\hat{s}_3 - \tilde{s}_3) + r_{3,4} \cdot (\hat{s}_4 - \tilde{s}_4)|^2$, and
$T_4 = |r_{4,4} \cdot (\hat{s}_4 - \tilde{s}_4)|^2$.

Equation (17) may be generalized for any value of M, as follows:

$$J = \sum_{i=M}^{1} T_i, \quad \text{Eq (18)}$$

$$\text{where } T_i = \left| \sum_{j=i}^{M} r_{i,j} \cdot (\hat{s}_j - \tilde{s}_j) \right|^2. \quad \text{Eq (19)}$$

As shown in equations (18) and (19), the cost function may be decomposed into a sum of M terms $T_1$ through $T_M$. Term $T_M$ is only dependent on detected symbol $\hat{s}_m$ for stream M, term $T_{M-1}$ is dependent on detected symbols $\hat{s}_{M-1}$ and $\hat{s}_M$ for streams M−1 and M, and so on, and term $T_1$ is dependent on detected symbols $\hat{s}_1$ through $\hat{s}_M$ for all M streams.

The cost function may be computed incrementally in M levels, one term $T_i$ for each level, starting with the last term $T_M$ for the first level. This is indicated by the reverse summation for J in equation (18), which starts with i=M. For each level, $T_i$ is computed for all hypotheses applicable for that level, and the cost function is updated.

The cost function may be computed by considering one additional symbol at a time, starting with $\hat{s}_M$ and ending with $\hat{s}_1$. To improve search performance, the streams may be sorted such that $\hat{s}_M$ corresponds to the best stream (e.g., with the highest SNR) and $\hat{s}_1$ corresponds to the worst stream (e.g., with the lowest SNR). The received vector y and the channel response matrix H may be reordered to achieve the desired ordering for the detected vector $\hat{s}$.

The LSD search may be performed in various manners. In a first embodiment, all hypotheses with cost values equal to or less than $r^2$ are retained, and all other hypotheses are discarded. In a second embodiment, only B best hypotheses are retained at each level, and all other hypotheses are discarded. For both embodiments, the total number of hypotheses to consider is reduced by discarding hypotheses with high cost values.

The LSD search may be performed as follows. For the first level, a list $P_M$ is formed with $2^{Q_M}$ hypothesized data symbols $\tilde{s}_M$ that might have been transmitted for data symbol $s_M$. $T_M$ is computed for the $2^{Q_M}$ hypothesized data symbols $\tilde{s}_M$ in list $P_M$ as shown in equation (19) to obtain $2^{Q_M}$ cost values. For the first embodiment, all hypothesized data symbols with cost values less than or equal to $r^2$ are retained and stored in a candidate list $C_M$. For the second embodiment, up to B hypothesized data symbols with the lowest cost values that are smaller than or equal to $r^2$ are retained and stored in candidate list $C_M$. For the second embodiment, hypothesized data symbols with cost values smaller than or equal to $r^2$ may be discarded if these cost values are not among the B lowest cost values. For both embodiments, all other hypothesized data symbols are discarded, which has the effect of pruning all hypothesized data vectors $\underline{\tilde{s}}$ containing the discarded symbols.

For the second level, a list $P_{M-1}$ is formed with $2^{Q_{M-1}}$ hypothesized data symbols $\tilde{s}_{M-1}$ that might have been transmitted for data symbol $s_{M-1}$. $T_{M-1}$ is computed for all valid hypothesized symbol pairs $(\tilde{s}_{M-1}, \tilde{s}_M)$ and summed with $T_M$ to obtain cost values for these hypothesized symbol pairs. The valid hypothesized symbol pairs include all possible combinations of each symbol in candidate list $C_M$ with each symbol in list $P_{M-1}$. The updated cost values may be computed as: $J_{M-1} = T_{M-1} + T_M$. For the first embodiment, all hypothesized symbol pairs with cost values smaller than or equal to $r^2$ are retained and stored in a candidate list $C_{M-1}$. For the second embodiment, up to B hypothesized symbol pairs with the lowest cost values that are smaller than or equal to $r^2$ are retained and stored in candidate list $C_{M-1}$. For both embodiments, all other hypothesized symbol pairs are discarded.

Each of the remaining levels may be evaluated in similar manner. A list $P_i$ is formed with $2^{Q_i}$ hypothesized data symbols $\tilde{s}_i$ that might have been transmitted for data symbol $s_i$. $T_i$ is computed for all valid hypothesized symbol sets $(\tilde{s}_i, \ldots, \tilde{s}_M)$ and summed with $T_{i+1}$ through $T_M$ to obtain cost values for these hypothesized symbol sets. The valid hypothesized symbol sets include all possible combinations of each hypothesis in candidate list $C_{i+1}$ with each symbol in list $P_i$. The updated cost values may be computed as: $J_i = T_i + \ldots + T_M$. For the first embodiment, all hypothesized symbol sets with cost values smaller than or equal to $r^2$ are retained and stored in a candidate list $C_i$. For the second embodiment, up to B hypothesized symbol sets with the lowest cost values that are smaller than or equal to $r^2$ are retained and stored in candidate list $C_i$. For both embodiments, all other hypothesized symbol sets are discarded.

After all M levels have been evaluated, extrinsic LLRs may be computed for all hypotheses stored in candidate list $C_1$, e.g., based on the max-log-MAP detector, as follows:

$$L_e(b_k) \approx \frac{1}{2} \max_{\tilde{b}: C_k^+} \left\{ -\frac{1}{\sigma_n^2} \cdot \|\underline{y} - H \cdot \tilde{s}\|^2 + \tilde{b}_{[k]}^T \cdot L_{a,[k]} \right\} - \frac{1}{2} \max_{\tilde{b}: C_k^-} \left\{ -\frac{1}{\sigma_n^2} \cdot \|\underline{y} - H \cdot \tilde{s}\|^2 + \tilde{b}_{[k]}^T \cdot L_{a,[k]} \right\}. \quad \text{Eq (20)}$$

where $C_k^+$ is a subset of candidate list $C_1$ and contains hypotheses for which $b_k = +1$; and $C_k^-$ is a subset of candidate list $C_1$ and contains hypotheses for which $b_k = -1$.

The extrinsic LLRs may also be computed based on the log-MAP detector or some other type of detector. The cost values already computed for the candidate hypotheses may be used to compute the extrinsic LLRs for these hypotheses. For clarity, the description above uses different candidate lists for different levels. A single candidate list C may be used for all M levels and may be updated at each level.

Figure 7:
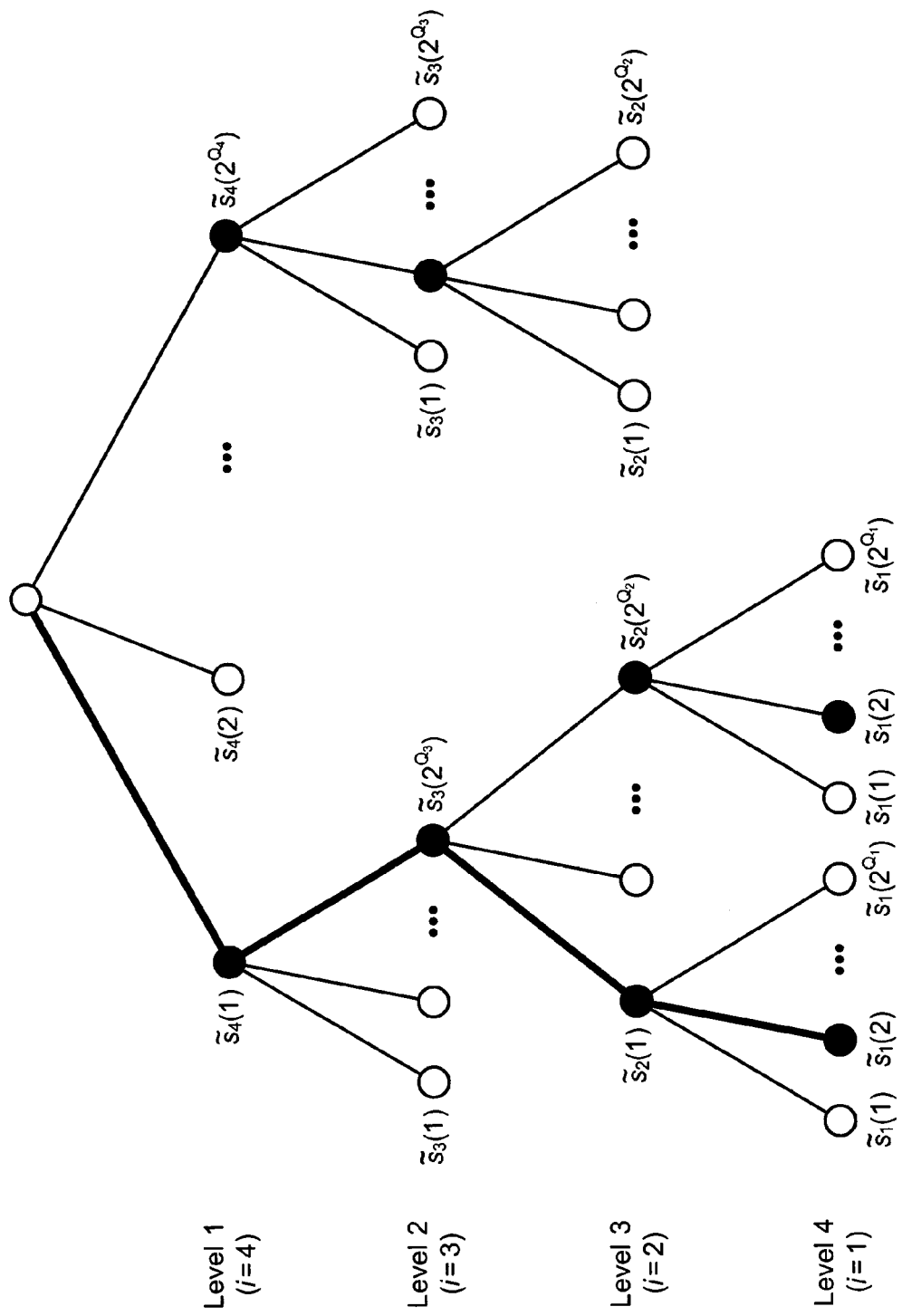
FIG. 7 shows an exemplary search tree for list sphere detection.

FIG. 7 shows an exemplary search tree for the second embodiment, which retains the B best hypotheses at each level. For this example, M=4, four terms $T_1$ through $T_4$ are computed, B=2, and the candidate list C contains up to two best hypotheses at each level. For the first level with i=4, $T_4$ is computed for $2^{Q_4}$ hypotheses for $2^{Q_4}$ possible data symbols that might have been transmitted for data symbol $s_4$, which are denoted as $\tilde{s}_4(1)$ through $\tilde{s}_4(2^{Q_4})$ in FIG. 7. The two best hypotheses are shown with black filled nodes. For the second level with i=3, $T_3$ is computed for $B \cdot 2^{Q_3}$ hypotheses for $B \cdot 2^{Q_3}$ possible symbol pairs that might have been transmitted for data symbols $s_3$ and $s_4$. The two best hypotheses are shown with black filled nodes. For the third level with i=2, $T_2$ is computed for $B \cdot 2^{Q_2}$ hypotheses for $B \cdot 2^{Q_2}$ possible symbol sets that might have been transmitted for data symbols $s_2$, $s_3$ and $s_4$. The two best hypotheses are shown with black filled nodes. For the last level with i=1, $T_1$ is computed for $B \cdot 2^{Q_1}$ hypotheses for $B \cdot 2^{Q_1}$ possible symbol sets that might have been transmitted for data symbols $s_1$, $s_2$, $s_3$ and $s_4$. The two best hypotheses are shown with black filled nodes. The set of symbols that yields the lowest cost value is shown by the heavy line.

In an embodiment, the number of candidate hypotheses to store in list C is a fixed value that may be selected based on a tradeoff between detection performance, complexity, and/or other considerations. This fixed value (B) may be for each level, as described above. This fixed value may also be for each node of a given level, in which case $B^{M-i} \cdot 2^{Q_i}$ hypotheses are considered per level. In another embodiment, the number of candidate hypotheses is configurable and may be selected based on signal constellation size, iteration number, detection performance, complexity, and/or other considerations. For example, B may be a function of signal constellation size so that more candidate hypotheses are stored for larger signal constellations to ensure sufficient accuracy in the LLR computation. B may also be constrained to be equal to or larger than some minimum value (e.g., $B_{min}=2$), which ensures that at least $B_{min}$ candidate hypotheses are stored at each level.

Two embodiments for computing cost for list sphere detection have been described above. The cost computation may also be performed in other manners.

List sphere detection is one search technique for reducing the number of hypotheses to consider for LLR computation. Other techniques may also be used to reduce the number of hypotheses for LLR computation. In another embodiment, a Markov chain Monte Carlo (MCMC) technique is used to generate a list of candidate hypotheses. The MCMC technique considers the M elements in data vector s in a sequential manner, evaluates one hypothesis for each element, and cycles through these M elements for multiple iterations. The list sphere detection and MCMC techniques are known in the art and described in various papers.

In another aspect, the receiver performs LLR computation independently for each of D best detected symbols, performs LLR computation jointly for the M–D remaining detected symbols, and reduces the number of hypotheses to consider for the joint LLR computation by performing a search using LSD, MCMC, or some other search technique. This detection scheme is referred to as a reduced order detection scheme and may be used for the single-pass receiver shown in FIG. 3 and the iterative receiver shown in FIG. 4. For the reduced order detection scheme, dimensionality is reduced from M to M–D by performing per-stream LLR computation for the D best streams, and the number of hypotheses to consider for the M–D remaining streams may be reduced from an upper bound of $$2^{\sum_{i=1}^{M-D} Q_i}$$

by performing a search. D may be adaptively selected based on channel conditions (e.g., SNRs) and/or some other factors. The SNR information may be readily obtained from the receiver spatial processing that provides the detected symbols used for the center point of an LSD search.

Figure 8:
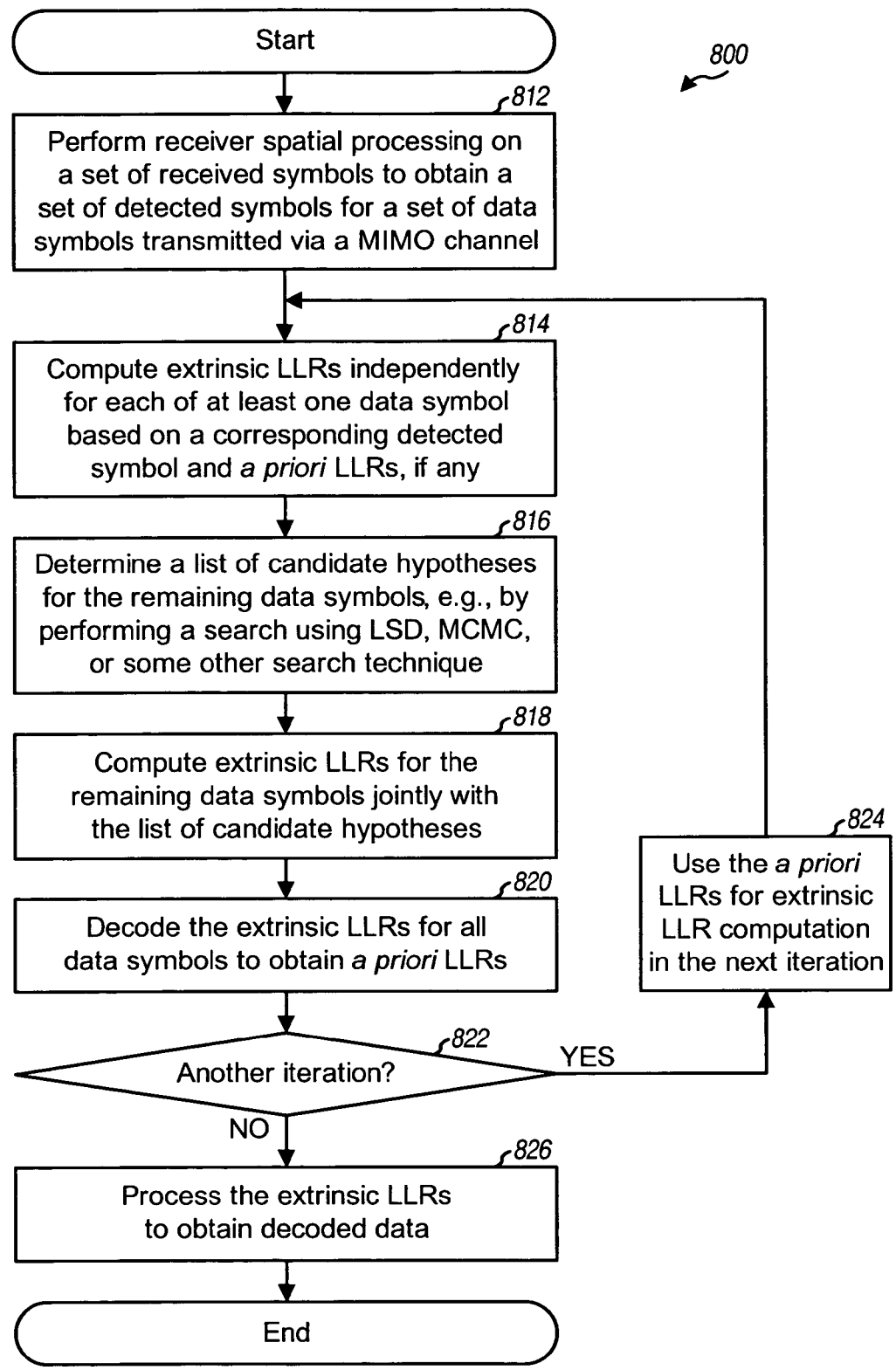
FIG. 8 shows a flow diagram for a reduced order detection scheme.

FIG. 8 shows a process 800 for performing detection and decoding based on the reduced order detection scheme. Receiver spatial processing is performed on a set of received symbols (e.g., vector y) to obtain a set of detected symbols (e.g., vector $\hat{s}$) for a set of data symbols (e.g., vector s) transmitted via a MIMO channel (block 812). Extrinsic LLRs are computed independently for each of at least one data symbol based on a corresponding detected symbol and a priori LLRs, if any, from the decoder (block 814). A list of candidate hypotheses is determined for the remaining data symbols, e.g., by performing a search using LSD, MCMC, or some other technique (block 816). Each candidate hypothesis corresponds to a different combination of symbols hypothesized to have been transmitted for the remaining data symbols. Extrinsic LLRs are then computed jointly for the remaining data symbols with the list of candidate hypotheses (block 818). The extrinsic LLRs for all data symbols are decoded to obtain a priori LLRs for the detector (block 820).

A determination is then made whether to perform another iteration of detection and decoding (block 822). If the answer is 'Yes', then a priori LLRs are computed to be used for LLR computation in the detector in the next iteration (block 824), and the process returns to block 814. Otherwise, the extrinsic LLRs from the detector are processed to obtain decoded data (block 826).

Figure 9:
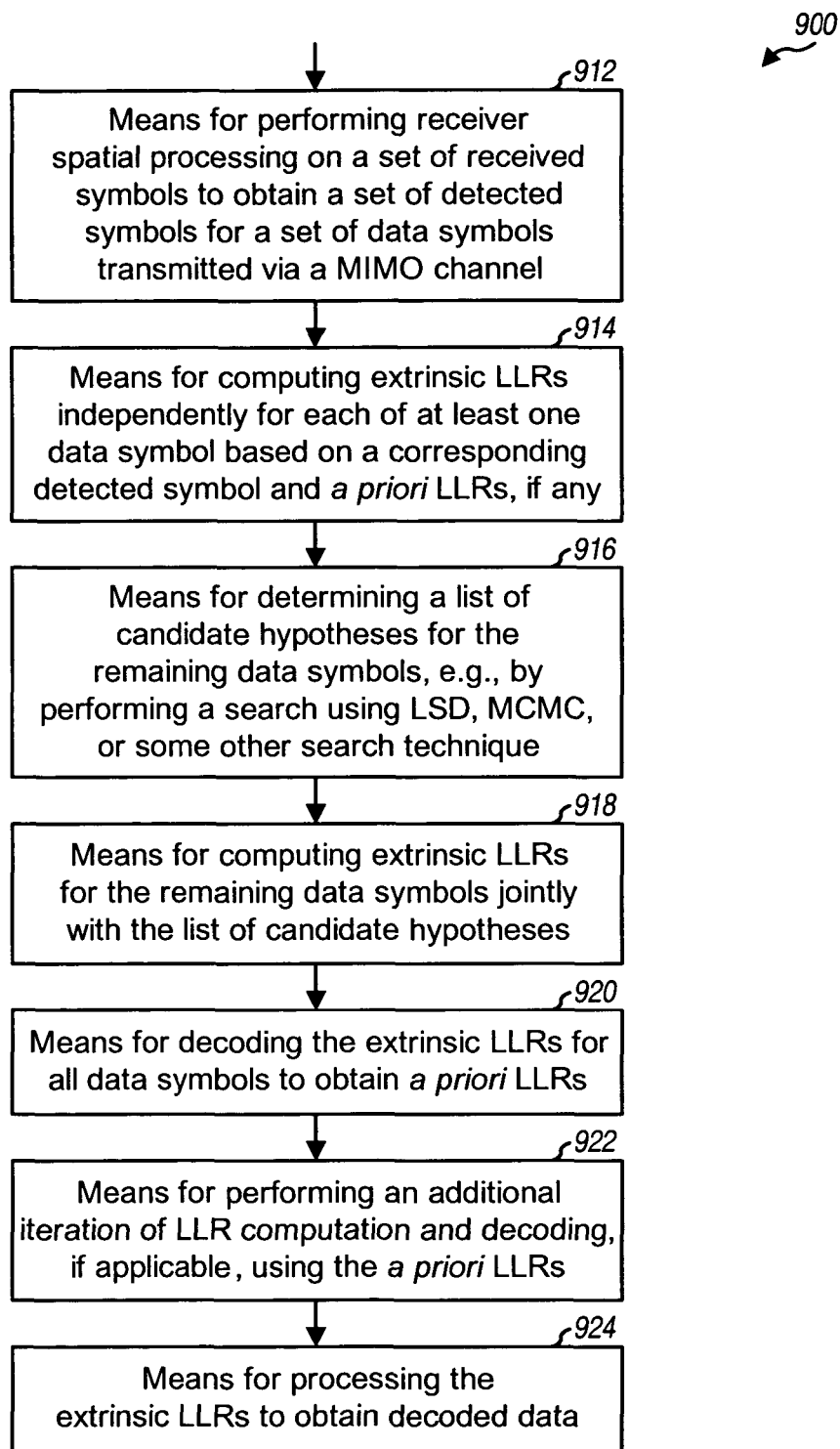
FIG. 9 shows an apparatus for the reduced order detection scheme.

FIG. 9 shows an apparatus 900 for performing detection and decoding based on the reduced order detection scheme. Apparatus 900 includes means for performing receiver spatial processing on a set of received symbols to obtain a set of detected symbols for a set of data symbols transmitted via a MIMO channel (block 912), means for computing extrinsic LLRs independently for each of at least one data symbol based on a corresponding detected symbol and a priori LLRs, if any, from the decoder (block 914), means for determining a list of candidate hypotheses for the remaining data symbols by performing a search (block 916), means for computing extrinsic LLRs jointly for the remaining data symbols with the list of candidate hypotheses (block 918), means for decoding the extrinsic LLRs for all data symbols to obtain a priori LLRs (block 920), means for performing an additional iteration of LLR computation and decoding, if applicable, using the a priori LLRs (block 922), and means for processing the extrinsic LLRs from the detector to obtain decoded data (block 924).

For the iterative receiver, the search for candidate hypotheses may be performed in various manners. In an embodiment, the search is performed for only the first iteration to obtain a list of candidate hypotheses, and this candidate list is used for all subsequent iterations. For this embodiment, the extrinsic LLRs for each subsequent iteration are computed with the a priori LLRs from the decoder and for the candidate hypotheses determined in the first iteration. In another embodiment, the search is performed for each iteration. In yet another embodiment, the search is performed for each iteration until a termination condition is encountered. This termination condition may be triggered, e.g., after a predetermined number of iterations has been completed, if the search provides the same list of candidate hypotheses for two consecutive iterations, and so on. For the embodiments in which the search is performed for multiple iterations, the threshold (e.g., the sphere radius) may be a fixed value for all iterations or may be a configurable value that may be set for each iteration based on, e.g., the a priori information from the decoder.

For the reduced order detection scheme, the reduction in complexity relative to the optimal log-MAP or max-log-MAP detector is dependent on the complexity of the search. For an LSD search, the complexity is determined by the number of nodes visited in the search tree, which in turn is dependent on various factors such as the number of hypotheses to store at each level (e.g., the value for B), the sphere radius $r^2$, the specific channel response matrix H, the SNR, and so on.

In another reduced complexity detection scheme, the receiver performs (1) per-stream LLR computation for all M streams for the first iteration and (2) joint LLR computation for the M–D worst streams or all M streams for a subsequent iteration, if needed, e.g., if the packet is decoded in error.

For the iterative receiver, the channel estimates may be updated during the iterative detection and decoding process to obtain improved channel estimates. For example, if pilot symbols are received and monitored multiple times during the iterative process, then the effective SNR of the channel estimates may be improved over time by performing averaging and/or other processing. The improved channel estimates may be used for receiver spatial processing, e.g., as shown in equations (8) through (10), for LLR computation, e.g., as shown in equations (6), (7) and (12), for cost computation for a search of candidate hypotheses, e.g., as shown in equations (18) and (19).

Various reduced complexity detection schemes have been described above. These schemes reduce the number of hypotheses to consider for the LLR computation while achieving good error rate performance that is close to the performance of the optimal detector.

Decoder 320 in FIG. 3 and decoder 420 in FIG. 4 may be implemented in various manners depending on the coding scheme(s) used at transmitter 110. Decoder 420 receives soft decision inputs and generates soft decision outputs for MIMO detector 410 and may be a soft-output Viterbi algorithm (SOVA) decoder if a convolutional code is used at transmitter 110, a Turbo decoder if a parallel or serial concatenated Turbo code is used, and so on. Decoder 320 may be a Viterbi decoder or a SOVA decoder for a convolutional code, a Turbo decoder for a Turbo code, and so on. A Turbo decoder may be a MAP decoder that may implement a BCJR soft-input soft-output MAP algorithm or a lower complexity derivative. These various types of decoder are known in the art and described in various literatures. For example, the SOVA decoder is described by J. Hagenauer et al. in a paper entitled "A Viterbi Algorithm with Soft-Decision Outputs and its Applications," IEEE Globecom, 1989, pp. 47.1.1-47.1.7. The MAP decoder is described by L. R. Bahl et al. in a paper entitled "Optimal Decoding of Linear Codes for Minimizing Symbol Error Rate," IEEE Transaction on Information Theory, March 1974, vol. 20, pp. 284-287.

The detection and decoding techniques described herein may be used for various MIMO transmission schemes, which may also be referred to as transmission modes, spatial modes, and so on. Table 1 lists some exemplary transmission modes and their short descriptions. The steered mode may also be called a beamforming mode, an eigensteering mode, a MIMO mode with beamforming, and so on. The unsteered mode may also be called a basic MIMO mode. The spatial spreading mode may also be called a pseudo-random transmit steering mode, a spatial expansion mode, and so on,

TABLE 1

| Transmission Mode | Description |
| --- | --- |
| Steered | Multiple data streams are transmitted on multiple orthogonal spatial channels (or eigenmodes) of a MIMO channel. |
| Unsteered | Multiple data streams are transmitted on multiple spatial channels (e.g., from multiple transmit antennas). |
| Spatial spreading | Multiple data streams are spatially spread across the spatial channels to achieve similar performance for all data streams. |

Each transmission mode has different capabilities and requirements. The steered mode typically provides better performance but requires spatial processing at transmitter 110 and receiver 150. The unsteered mode requires no spatial processing at transmitter 110. For example, transmitter 110 may transmit one data stream from each transmit antenna. The spatial spreading mode transmits M data streams with different spatial mapping matrices so that these data streams observe an ensemble of effective channels and achieve similar performance. A suitable transmission mode may be selected based on the availability of channel state information, the capabilities of the transmitter and receiver, and so on.

For the steered mode, data is transmitted on up to M eigenmodes of the MIMO channel, which may be obtained by diagonalizing the MIMO channel response matrix H via singular value decomposition of H or eigenvalue decomposition of a correlation matrix of H, which is $A=H^H \cdot H$. The eigenvalue decomposition of A may be expressed as:

$$A = H^H \cdot H = E \cdot \Lambda \cdot E^H, \quad \text{Eq (21)}$$

where E is a T×T unitary matrix of eigenvectors of A; and
Λ is a T×T diagonal matrix of eigenvalues of A.

Transmitter 110 may perform spatial processing with the eigenvectors in E to transmit data on the M eigenmodes of H. The diagonal matrix Λ contains possible non-negative real values along the diagonal and zeros elsewhere. These diagonal entries are referred to as eigenvalues of A and represent the power gains for the M eigenmodes.

Table 2 shows the transmitter spatial processing for the three transmission modes and the effective MIMO channel response matrix for each transmission mode. In Table 2, the subscript "es" denotes the steered mode (or eigensteering), "us" denotes the unsteered mode, and "ss" denotes the spatial spreading mode.

TABLE 2

|  | Steered mode | Unsteered mode | Spatial spreading |
|---|---|---|---|
| Transmitter | $x_{es} = E \cdot s$ | $x_{us} = s$ | $x_{ss} = V \cdot s$ |
| Effective Channel | $H_{es} = H_{ch} \cdot E$ | $H_{us} = H_{ch}$ | $H_{ss} = H_{ch} \cdot V$ |

For a MIMO system with multiple subbands, the transmitter spatial processing shown in Table 2 may be performed for each subband l. In equation (1), P(l)=E(l) for the steered mode, P(l)=I for the unsteered mode, and P(l)=V(l) for the spatial spreading mode. V(l) is a T×T spatial mapping matrix used for spatial spreading and may be generated based on a Hadamard matrix, a Fourier matrix, and so on.

For a MIMO system with multiple subbands, the M eigenvalues for each subband l may be ordered from largest to smallest, so that the eigenmodes of H(l) are ranked from highest SNR to lowest SNR. Wideband eigenmode m may be formed with the m-th eigenmode for each of the L subbands. The principal wideband eigenmode (with m=1) is associated with the largest eigenvalues for all L subbands, the second wideband eigenmode (with m=2) is associated with the second largest eigenvalues for all L subbands, and so on. M data streams may be sent on the M wideband eigenmodes.

The principal wideband eigenmode has the highest average SNR and typically also has less SNR variability across time and frequency. Conversely, the weakest wideband eigenmode has the lowest average SNR and typically has more SNR variability. The techniques described herein may be used for data transmission on the M wideband eigenmodes. In an embodiment, the receiver may perform per-stream LLR computation for one or more of the strongest wideband eigenmodes and joint LLR computation for the remaining wideband eigenmodes. The number of hypotheses to consider for the joint LLR computation may be reduced by performing a search using LSD, MCMC, or some other search technique.

The detection and decoding techniques described herein may be implemented by various means. For example, these techniques may be implemented in hardware, firmware, software, or a combination thereof. For a hardware implementation, the processing units used to perform detection and decoding may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 192 in FIG. 1) and executed by a processor (e.g., processor 190). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to perform detection independently for each of at least one data stream selected from among multiple data streams transmitted by a transmitter, to perform detection jointly for remaining data streams among the multiple data streams, to compute log-likelihood ratios (LLRs) for code bits for each of the at least one data stream independent of other data streams, and to compute LLRs for code bits for the remaining data streams jointly; and
a memory coupled to the at least one processor.

2. The apparatus of claim 1, wherein the at least one processor is configured to derive soft decisions independently for each of the at least one data stream, and to derive soft decisions jointly for the remaining data streams.

3. The apparatus of claim 2, wherein the at least one processor is configured to decode the soft decisions for the multiple data streams to obtain a priori information, and to perform detection for an additional iteration using the a priori information.

4. The apparatus of claim 2, wherein the at least one processor is configured to decode the soft decisions based on a soft-output Viterbi algorithm (SOVA) decoder or a maximum a posteriori probability (MAP) decoder.

5. The apparatus of claim 1, wherein the at least one processor is configured to perform receiver spatial processing for the at least one data stream to obtain at least one detected symbol stream, and to derive soft decisions independently for each of the at least one detected symbol stream.

6. The apparatus of claim 5, wherein the at least one processor is configured to perform receiver spatial processing based on a zero-forcing (ZF) technique or a minimum mean square error (MMSE) technique.

7. The apparatus of claim 1, wherein the at least one processor is configured to compute the LLRs based on a maximum a posteriori probability (MAP) detector.

8. The apparatus of claim 1, wherein the at least one processor is configured to check each of the at least one data stream after the independent detection, and to perform detection jointly for the remaining data streams if the at least one data stream passes the check.

9. The apparatus of claim 1, wherein the at least one data stream has highest signal-to-noise-and-interference ratios (SNRs) among SNRs for the multiple data streams.

10. A method comprising:
performing detection independently for each of at least one data stream selected from among multiple data streams transmitted by a transmitter;
performing detection jointly for remaining data streams among the multiple data streams;
computing log-likelihood ratios (LLRs) for code bits for each of the at least one data stream detected independently of other data streams; and
computing LLRs for code bits for the remaining data streams detected jointly.

11. The method of claim 10, wherein the performing detection independently comprises deriving soft decisions independently for each of the at least one data stream, and wherein the performing detection jointly comprises deriving soft decisions jointly for the remaining data streams.

12. The method of claim 11, further comprising:
decoding the soft decisions for the multiple data streams to obtain a priori information; and
performing detection for an additional iteration using the a priori information.

13. An apparatus comprising:
means for performing detection independently for each of at least one data stream selected from among multiple data streams transmitted by a transmitter;
means for performing detection jointly for remaining data streams among the multiple data streams;
means for computing log-likelihood ratios (LLRs) for code bits for each of the at least one data stream detected independently of other data streams; and
means for computing LLRs for code bits for the remaining data streams detected jointly.

14. The apparatus of claim 13, wherein the means for performing detection independently comprises means for deriving soft decisions independently for each of the at least one data stream, and wherein the means for performing detection jointly comprises means for deriving soft decisions jointly for the remaining data streams.

15. The apparatus of claim 14, further comprising:
means for decoding the soft decisions for the multiple data streams to obtain a priori information; and
means for performing detection for an additional iteration using the a priori information.

16. An apparatus comprising:
at least one processor configured to compute log-likelihood ratios (LLRs) independently for each of at least one data symbol in a set of data symbols transmitted via a multiple-input multiple-output (MIMO) channel, and to compute LLRs jointly for remaining data symbols in the set of data symbols, to derive a channel estimate based on a channel response matrix for the MIMO channel and a spatial mapping matrix used to transmit the set of data symbols, to derive a spatial filter matrix based on the channel estimate, to perform receiver spatial processing on a set of received symbols based on the spatial filter matrix to obtain at least one detected symbol, and to compute the LLRs for each of the at least one detected symbol; and
a memory coupled to the at least one processor.

17. The apparatus of claim 16, wherein the at least one processor is configured to compute the LLRs for the remaining data symbols by using fixed values for the at least one data symbol.

18. The apparatus of claim 16, wherein the at least one processor is configured to compute the LLRs for the remaining data symbols by excluding the at least one data symbol.

19. The apparatus of claim 16, wherein the at least one processor is configured to compute the LLRs based on a maximum a posteriori probability (MAP) detector.

20. The apparatus of claim 16, wherein the at least one processor is configured to decode the LLRs for the set of data symbols to obtain a priori LLRs, and to jointly compute the LLRs for the remaining data symbols for an additional iteration using the a priori LLRs.

21. The apparatus of claim 16, wherein the at least one processor is configured to perform receiver spatial processing on a set of received symbols to obtain at least one detected symbol for the at least one data symbol, and to compute the LLRs for each of the at least one detected symbol.

22. The apparatus of claim 16, wherein the at least one processor is configured to compute LLRs separately for each of multiple sets of data symbols transmitted via the MIMO channel on multiple frequency subbands.

23. A method comprising:
computing log-likelihood ratios (LLRs) independently for each of at least one data symbol in a set of data symbols transmitted via a multiple-input multiple-output (MIMO) channel, wherein computing the LLRs comprises:
deriving a channel estimate based on a channel response matrix for the MIMO channel and a spatial mapping matrix used to transmit the set of data symbols, deriving a spatial filter matrix based on the channel estimate;
performing receiver spatial processing on a set of received symbols based on the spatial filter matrix to obtain at least one detected symbol; and
computing the LLRs for each of the at least one detected symbol; and
computing LLRs jointly for remaining data symbols in the set of data symbols.

24. The method of claim 23, further comprising:
decoding the LLRs for the set of data symbols to obtain a priori LLRs; and
jointly computing the LLRs for the remaining data symbols for an additional iteration using the a priori LLRs.

25. The method of claim 23, further comprising:
computing LLRs separately for each of multiple sets of data symbols transmitted via the MIMO channel on multiple frequency subbands.

26. An apparatus comprising:
means for computing log-likelihood ratios (LLRs) independently for each of at least one data symbol in a set of data symbols transmitted via a multiple-input multiple-output (MIMO) channel, wherein the means for computing the LLRs comprises:
means for deriving a channel estimate based on a channel response matrix for the MIMO channel and a spatial mapping matrix used to transmit the set of data symbols, deriving a spatial filter matrix based on the channel estimate;
means for performing receiver spatial processing on a set of received symbols based on the spatial filter matrix to obtain at least one detected symbol; and
means for computing the LLRs for each of the at least one detected symbol; and
means for computing LLRs jointly for remaining data symbols in the set of data symbols.

27. The apparatus of claim 26, further comprising:
means for decoding the LLRs for the set of data symbols to obtain a priori LLRs; and
means for jointly computing the LLRs for the remaining data symbols for an additional iteration using the a priori LLRs.

28. The apparatus of claim 26, further comprising:
means for computing LLRs separately for each of multiple sets of data symbols transmitted via the MIMO channel on multiple frequency subbands.

29. An apparatus comprising:
at least one processor configured to compute log-likelihood ratios (LLRs) independently for each of at least one data symbol in a set of data symbols transmitted via a multiple-input multiple-output (MIMO) channel, to determine a list of candidate hypotheses for remaining data symbols in the set of data symbols, and to compute LLRs jointly for the remaining data symbols with the list of candidate hypotheses; and
a memory coupled to the at least one processor.

30. The apparatus of claim 29, wherein the at least one processor is configured to determine the list of candidate hypotheses using list sphere detection.

31. The apparatus of claim 29, wherein the at least one processor is configured to determine the list of candidate hypotheses using Markov chain Monte Carlo technique.

32. The apparatus of claim 29, wherein the at least one processor is configured to select one of the remaining data symbols at a time for consideration and, after selecting each remaining data symbol, to determine the list of candidate hypotheses for all selected remaining data symbols based on a cost function.

33. The apparatus of claim 32, wherein the list of candidate hypotheses includes at most B best hypotheses for the selected remaining data symbols, where $B \geq 1$.

34. The apparatus of claim 33, wherein B is selected based on a modulation scheme used for the set of data symbols.

35. The apparatus of claim 32, wherein the selected remaining data symbols correspond to a plurality of nodes in a search tree, and wherein the list of candidate hypotheses includes at most B best hypotheses for each of the plurality of nodes, where $B \geq 1$.

36. The apparatus of claim 32, wherein the list of candidate hypotheses includes at a minimum $B_{min}$ best hypotheses for the selected remaining data symbols, where $B_{min} \geq 1$.

37. The apparatus of claim 32, wherein the list of candidate hypotheses includes all hypotheses with cost values less than or equal to a threshold.

38. The apparatus of claim 37, wherein the threshold is determined based on information from a decoder.

39. The apparatus of claim 29, wherein the at least one processor is configured to perform receiver spatial processing on a set of received symbols to obtain a set of detected symbols, to derive an upper triangular matrix based on a channel estimate, and to determine the set of candidate hypotheses based on a cost function of the set of detected symbols and the upper triangular matrix.

40. A method comprising:
computing log-likelihood ratios (LLRs) independently for each of at least one data symbol in a set of data symbols transmitted via a multiple-input multiple-output (MIMO) channel;
determining a list of candidate hypotheses for remaining data symbols in the set of data symbols; and
computing LLRs jointly for the remaining data symbols with the list of candidate hypotheses.

41. The method of claim 40, wherein the determining the list of candidate hypotheses comprises:
determining the list of candidate hypotheses for the remaining data symbols using list sphere detection.

42. The method of claim 40, further comprising:
performing receiver spatial processing on a set of received symbols to obtain a set of detected symbols; and
deriving an upper triangular matrix based on a channel estimate, and
wherein the determining the list of candidate hypotheses comprises determining the set of candidate hypotheses based on a cost function of the set of detected symbols and the upper triangular matrix.

43. An apparatus comprising:
means for computing log-likelihood ratios (LLRs) independently for each of at least one data symbol in a set of data symbols transmitted via a multiple-input multiple-output (MIMO) channel;
means for determining a list of candidate hypotheses for remaining data symbols in the set of data symbols; and
means for computing LLRs jointly for the remaining data symbols with the list of candidate hypotheses.

44. The apparatus of claim 43, wherein the means for determining the list of candidate hypotheses comprises:
means for determining the list of candidate hypotheses for the remaining data symbols using list sphere detection.

45. The apparatus of claim 43, further comprising:
means for performing receiver spatial processing on a set of received symbols to obtain a set of detected symbols; and
means for deriving an upper triangular matrix based on a channel estimate, and
wherein the means for determining the list of candidate hypotheses comprises means for determining the set of candidate hypotheses based on a cost function of the set of detected symbols and the upper triangular matrix.

* * * * *